(12) United States Patent
Liu et al.

(10) Patent No.: US 12,120,629 B2
(45) Date of Patent: Oct. 15, 2024

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 365 days.

(21) Appl. No.: 17/588,214

(22) Filed: Jan. 29, 2022

(65) Prior Publication Data
US 2022/0159610 A1    May 19, 2022

Related U.S. Application Data

(63) Continuation of application No. PCT/CN2020/104725, filed on Jul. 27, 2020.

(30) Foreign Application Priority Data

Aug. 1, 2019   (CN) .......................... 201910708251.8

(51) Int. Cl.
   *H04W 64/00*      (2009.01)
   *H04L 5/00*       (2006.01)

(52) U.S. Cl.
   CPC ......... *H04W 64/003* (2013.01); *H04L 5/0005* (2013.01); *H04L 5/0055* (2013.01)

(58) Field of Classification Search
   CPC ... H04W 64/003; H04W 4/023; H04W 4/021; H04W 4/40; H04L 5/0005; H04L 5/0055; H04L 1/1607; H04L 1/1812; H04L 5/0053

(Continued)

(56) References Cited

U.S. PATENT DOCUMENTS 10,257,798 B1 *   4/2019   Koelemeij .......... H04W 56/006
2017/0041916 A1   2/2017   Soret

FOREIGN PATENT DOCUMENTS

CA    3073822 A1 *   3/2019   ........... H04B 7/2643
CN    108111266 A      6/2018
(Continued)

OTHER PUBLICATIONS

ISR received in application No. PCT/CN2020/104725 dated Nov. 2, 2020.

(Continued)

*Primary Examiner* — Tanmay K Shah

(57) ABSTRACT

The present disclosure provides a method and a device in a communication node for wireless communications. A communication node transmits a first signaling, the first signaling is used to indicate a first identity (ID) and a first distance; transmits a first signal, the first signaling is also used to indicate time-frequency resources occupied by the first signal; and monitors a second signal, the second signal is used to determine that the first signal is not correctly received; a geographic location of the communication node is used to determine a first zone, and an ID of the first zone is used to determine the first ID; a first characteristic geographic location is a geographic location located within the first zone; a distance between a geographic location of the communication node and the first characteristic geographic location is used to determine the first distance. This application improves the effectiveness of feedback.

20 Claims, 8 Drawing Sheets

(58) Field of Classification Search
USPC .................................................... 455/456.1
See application file for complete search history.

(56) References Cited

FOREIGN PATENT DOCUMENTS

| CN | 109891802 A | 6/2019 | | |
|---|---|---|---|---|
| WO | WO-2005088918 A1 | * | 9/2005 | ......... H04L 12/1845 |
| WO | WO-2012091877 A1 | * | 7/2012 | ............... G01S 5/08 |
| WO | 2018228868 A1 | | 12/2018 | |
| WO | 2019004688 A1 | | 1/2019 | |

OTHER PUBLICATIONS

Qualcomm IncPhysical layer procedures for sidelink' 3GPP TSG RAN WGI Meeting #97; RI-1907274, May 17, 2019 (May 17, 2019).
Hua Wei et al. sidelink physicallayer procedures for NR V2X 3GPP TSG RAN WGI Meeting #97; RI-1906008, May 17, 2019 (May 17, 2019).
Vivo. "Physical Layer Procedure for NR Sidelink" 3GPP TSG RAN WGI Meeting #97; RI-1906142, May 17, 2019 (May 17, 2019).
First Office Action of Chinses patent application No. CN201910708251.8 dated Jan. 5, 2023.
First Search Report of Chinses patent application No. CN201910708251.8 dated Dec. 20, 2022.

* cited by examiner

METHOD AND DEVICE IN NODES USED FOR WIRELESS COMMUNICATION

CROSS REFERENCE TO RELATED APPLICATIONS

This application is the continuation of International Patent Application No. PCT/CN2020/104725, filed on Jul. 27, 2020, which claims the priority benefit of Chinese Patent Application No. 201910708251.8, filed on Aug. 1, 2019, the full disclosure of which is incorporated herein by reference.

BACKGROUND

Technical Field

The present disclosure relates to transmission methods and devices in wireless communication systems, and in particular to a transmission scheme and device related to feedback information in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. A technical Study Item (SI) of NR V2X was approved at 3GPP RAN #80 Plenary Session.

SUMMARY

Compared with the existing LIE V2X system, NR V2X has a notable feature in supporting groupcast and unicast as well as supporting Hybrid Automatic Repeat Request (HARQ) function. An independent Physical Sidelink Feedback Channel (PSFCH) is agreed to be introduced at 3GPP RANI #95 meeting, where the PSFCH is used to carry a HARQ, and besides, 3GPP agrees that a receiving user of groupcast can judge whether a HARQ feedback is transmitted according to a transmission distance. The design of the PSFCH carrying the HARQ feedback requires solutions.

In view of the problem in the design of the PSFCH carrying the HARQ feedback in NR V2X, the present disclosure discloses a solution. It should be noted that the embodiments of a first communication node in the present disclosure and the characteristics of the embodiments may be applied to a second communication node if no conflict is incurred, and vice versa. And the embodiments in the present disclosure and the characteristics in the embodiments can be arbitrarily combined if there is no conflict.

The present disclosure provides a method in a first communication node for wireless communications, comprising:

transmitting a first signaling, the first signaling being used to indicate a first identity (ID) and a first distance;

transmitting a first signal, the first signaling also being used to indicate time-frequency resources occupied by the first signal; and monitoring a second signal, the second signal being used to determine that the first signal is not correctly received;

herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

In one embodiment, the first distance is determined based on a distance between a geographic location of the first communication node and the first characteristic geographic location, so that a transmitting end of a data signal can adjust the setting of a communication range or set a virtual communication range according to its own geographic location, which can compensate at the transmitting end the geographic location ambiguity incurred by zones, thus ensuring the timely transmission of the HARQ feedback at the receiving end of the data signal.

In one embodiment, through the setting of the first distance, a receiving user within the communication range is ensured to execute the HARQ feedback, which solves the problem of missing detection or transmission of the HARQ feedback incurred by different understanding of the geographic location of the transmitting end by the transmitting end of the data signal and the receiving end of the data signal during sidelink transmission, which improves the accuracy of the HARQ feedback, thus ensuring the performance of the transmission.

According to one aspect of the present disclosure, the above method is characterized in also comprising:

determining a target distance;

herein, a distance between a geographic location of the first communication node and the first characteristic geographic distance is used to determine a difference value between the first distance and the target distance.

In one embodiment, a difference value between the first distance and the target distance is determined according to a distance between a geographic location of the first communication node and the first characteristic geographic location, which can reduce the HARQ feedback of users outside the communication range while ensuring the transmission of HARQ feedback, thus reducing the false alarm probability of the HARQ feedback.

According to one embodiment of the present disclosure, the above method is characterized in that a first sequence is used for generating the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence.

According to one aspect of the present disclosure, the above method is characterized in also comprising:

receiving first information;

herein, the first information is used to determine a first length, a first width, a first longitude reusing factor and a first latitude reusing factor, the first length and the first width are used to determine Y zones, and the first zone is one of the Y zones, Y being a positive integer greater than 1; a geographic location of the first communication node is located within the first zone; and the first longitude reusing factor and the first latitude reusing factor are used together to determine the ID of the first zone.

According to one aspect of the present disclosure, the above method is characterized in that the first zone is one of X zones, any two of the X zones are orthogonal, X being a positive integer greater than 1; and an ID of any of the X zones is equal to the first ID.

According to one aspect of the present disclosure, the above method is characterized in also comprising:

transmitting second information;

herein, the second information is used to indicate the first length, the first width, the first longitude reusing factor and the first latitude reusing factor.

The present disclosure provides a method in a second communication node for wireless communications, comprising:

receiving a first signaling, the first signaling being used to determine a first ID and a first distance;

receiving a first signal, the first signaling also being used to determine time-frequency resources occupied by the first signal; and transmitting a second signal, or cancelling the second signal, the second signaling being used to determine that the first signal is not correctly received;

herein, the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

In one embodiment, whether the second signal is transmitted according to a distance between the X characteristic geographic locations and the reference geographic location, which solves the problem of the missing transmission of the HARQ feedback incurred by zone ambiguity due to the reusing of the first ID, thus improving the effectiveness of the HARQ feedback.

According to one embodiment of the present disclosure, the above method is characterized in that a first sequence is used for generating the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence.

According to one aspect of the present disclosure, the above method is characterized in also comprising:

receiving second information;

herein, the second information is used to determine a first length, a first width, a first longitude reusing factor and a first latitude reusing factor, the first length and the first width are used to determine Y zones, and any of the X zones is one of the Y zones, Y being a positive integer greater than 1; the first ID, the first longitude reusing factor and the first latitude reusing factor are used together to determine the X zones out of the Y zones.

According to one aspect of the present disclosure, the above method is characterized in also comprising:

receiving third information;

herein, the third information is used to determine a second length and a second width, a geographic location of the second communication node, the second length and the second width are used together to determine a second zone, and the reference geographic location is a predefined geographic location within the second zone.

According to one aspect of the present disclosure, the above method is characterized in that the X characteristic geographic locations are respectively X predefined geographic locations located within the X zones, or the X characteristic geographic locations are respectively X geographic locations located within the X zones closest to the reference geographic location.

In one embodiment, through the X characteristic geographic locations being respectively X geographic locations closest to the reference geographic location within the X zones, the compensation to the communication range is realized at the receiving end of the data signal, which solves the problem of missing detection or transmission of the HARQ feedback caused by the different understanding of the geographic location of the transmitting end by the transmitting end and the receiving end during sidelink transmission, thus ensuring the timely transmission of the HARQ feedback at the receiving end of the data signal.

The present disclosure provides a first communication node for wireless communications, comprising:

a first transmitter, transmitting a first signaling, the first signaling being used to indicate a first ID and a first distance;

a second transmitter, transmitting a first signal, the first signaling also being used to indicate time-frequency resources occupied by the first signal; and a first receiver, monitoring a second signal, the second signal being used to determine that the first signal is not correctly received;

herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

The present disclosure provides a second communication node for wireless communications, comprising:

a second receiver, receiving a first signaling, the first signaling being used to determine a first ID and a first distance;

a third receiver, receiving a first signal, the first signaling also being used to determine time-frequency resources occupied by the first signal; and a third transmitter, transmitting a second signal, or cancelling the second signal, the second signaling being used to determine that the first signal is not correctly received;

herein, the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

In one embodiment, the method in the present disclosure is advantageous in the following aspects:

the method in the present disclosure enables that the transmitting end of the data signal can adjust the setting of the communication range or set the virtual communication range according to its own geographic location, which can compensate at the transmitting end the geographic location ambiguity incurred by zones, thus ensuring the timely transmission of the HARQ feedback at the receiving end of the data signal.

the method in the present disclosure ensures that a receiving user within the communication range can execute a HARQ feedback, which avoids the problem of missing detection or transmission of the HARQ feedback incurred by different understanding of the geographic location of the transmitting end by the transmitting end of the data signal and the receiving end of the data signal during sidelink transmission, so as to improve the accuracy of the HARQ feedback, thus ensuring the performance of the transmission.

the method in the present disclosure can reduce the HARQ feedback of users outside the communication range while ensuring the transmission of HARQ feedback, thus reducing the false alarm probability of the HARQ feedback.

the method in the present disclosure solves the problem of missing HARQ feedback caused by zone ambiguity due to the reusing of Zone_ID, which improves the effectiveness of the HARQ feedback.

the method in the present disclosure realizes the compensation of the transmitting end of the data signal to the communication range and solves the problem of missing detection or transmission of the HARQ feedback caused by the different understanding of the geographic location of the transmitting end by the transmitting end and the receiving end during sidelink transmission, thus ensuring the timely transmission of the HARQ feedback at the receiving end of the data signal.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
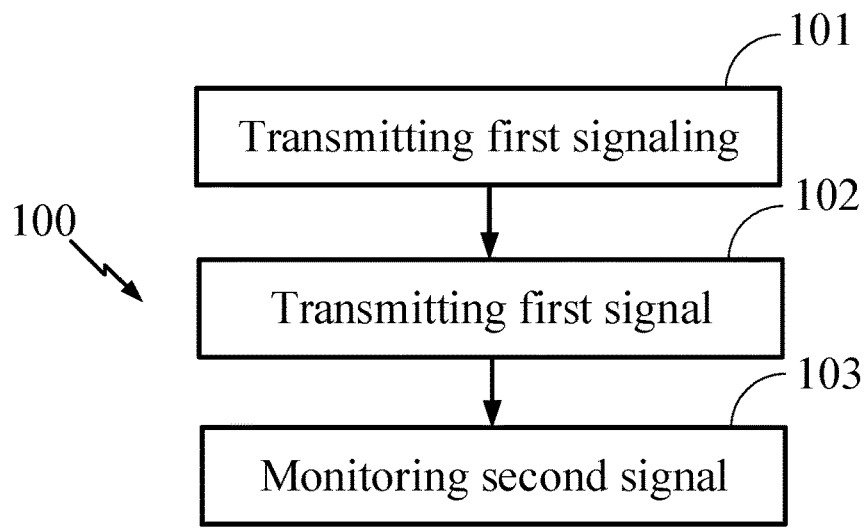
FIG. 1 illustrates a flowchart of a first signaling, a first signal and a second signal according to one embodiment of the present disclosure.

Embodiment 1 illustrates a flowchart of a first signaling, a first signal and a second signal according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first communication node in the present disclosure transmits a first signaling in step 101, and the first signaling is used to indicate a first ID and a first distance; transmits a first signal in step 102, the first signaling is also used to indicate time-frequency resources occupied by the first signal; and monitors a second signal in step 103, the second signal is used to determine that the first signal is not correctly received; herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

In one embodiment, the first signaling is transmitted through an air interface.

In one embodiment, the first signaling is transmitted through a radio interface.

In one embodiment, the first signaling is transmitted through a PC5 interface.

In one embodiment, the first signaling is transmitted through a Uu interface.

In one embodiment, the first signaling is transmitted through a sidelink.

In one embodiment, the first signaling is carried by a baseband signal.

In one embodiment, the first signaling is carried by a Radio-Frequency (RF) signal.

In one embodiment, the first signaling is a physical-layer signaling.

In one embodiment, the first signaling is a higher-layer signaling.

In one embodiment, the first signaling is broadcast.

In one embodiment, the first signaling is unicast.

In one embodiment, the first signaling carries Sidelink Control Information (SCI).

In one embodiment, the first signaling carries partial or all fields in SCI.

In one embodiment, the first signaling is transmitted through a Physical Sidelink Control Channel (PSCCH).

In one embodiment, the first signaling is transmitted through a Physical Sidelink Shared Channel (PSSCH).

In one embodiment, the first signaling comprises all or partial IEs in a Radio Resource Control (RRC) signaling.

In one embodiment, the first signaling comprises all or partial fields in an Information Element (IE) in an RRC signaling.

In one embodiment, a target receiver of the first signaling is the second communication node in the present disclosure.

In one embodiment, the above phrase of "the first signaling being used to indicate a first ID and a first distance" includes the following meaning: the first signaling is used by the first communication node in the present disclosure to determine the first ID and the first distance.

In one embodiment, the above phrase of "the first signaling being used to indicate a first ID and a first distance" includes the following meaning: the first signaling is used to directly indicate the first ID and the first distance.

In one embodiment, the above phrase of "the first signaling being used to indicate a first ID and a first distance" includes the following meaning: the first signaling is used to indirectly indicate the first ID and the first distance.

In one embodiment, the above phrase of "the first signaling being used to indicate a first ID and a first distance" includes the following meaning: the first signaling is used to explicitly indicate the first ID and the first distance.

In one embodiment, the above phrase of "the first signaling being used to indicate a first ID and a first distance" includes the following meaning: the first signaling is used to implicitly indicate the first ID and the first distance.

In one embodiment, the above phrase of "the first signaling being used to indicate a first ID and a first distance" includes the following meaning: the first signaling indicates a first parameter, a second parameter and the first distance, herein, the first parameter and the second parameter are used to acquire the first ID.

In one embodiment, the above phrase of "the first signaling being used to indicate a first ID and a first distance" includes the following meaning: the first signaling indicates a first parameter $m_1$, a second parameter $n_1$ and the first distance, herein, the first parameter $m_1$ and the second parameter $n_1$ acquire the first ID $Zone\_id_1$ through the following formula:

$$Zone\_id_1 = n_1 * W + m_1$$

Where W is configured or preconfigured.

In one embodiment, the above phrase of "the first signaling also being used to indicate time-frequency resources occupied by the first signal" includes the following meaning: the first signaling is also used by the first communication node in the present disclosure to indicate time-frequency resources occupied by the first signal.

In one embodiment, the above phrase of "the first signaling also being used to indicate time-frequency resources occupied by the first signal" includes the following meaning: the first signaling is also used to directly indicate time-frequency resources occupied by the first signal.

In one embodiment, the above phrase of "the first signaling also being used to indicate time-frequency resources occupied by the first signal" includes the following meaning: the first signaling is also used to indirectly indicate time-frequency resources occupied by the first signal.

In one embodiment, the above phrase of "the first signaling also being used to indicate time-frequency resources occupied by the first signal" includes the following meaning: the first signaling is also used to explicitly indicate time-frequency resources occupied by the first signal.

In one embodiment, the above phrase of "the first signaling also being used to indicate time-frequency resources occupied by the first signal" includes the following meaning: the first signaling is also used to implicitly indicate time-frequency resources occupied by the first signal.

In one embodiment, two different fields in the first signaling are respectively used to indicate the first ID and the first distance.

In one embodiment, a same field in the first signaling is used to indicate the first ID and the first distance.

In one embodiment, the first signaling is also used to indicate a Modulation Coding Scheme (MCS) adopted by the first signal.

In one embodiment, the first signaling is also used to indicate a Redundancy Version (RV) of the first signal.

In one embodiment, the first ID is a zone ID.

In one embodiment, the first ID is a zone index.

In one embodiment, the first identifier is an integer.

In one embodiment, the first identifier is a non-negative integer.

In one embodiment, the first distance is represented by a geographic distance.

In one embodiment, the first distance is a geodetic distance.

In one embodiment, the first distance is a 2 Dimension (2D) geographic distance.

In one embodiment, the first distance is a 3 Dimension (3D) geographic distance.

In one embodiment, the first distance is measured by meter (m).

In one embodiment, the first distance is expressed by a transmission delay of a radio signal.

In one embodiment, the first signal is a baseband signal.

In one embodiment, the first signal is an RF signal.

In one embodiment, the first signal is transmitted through an air interface.

In one embodiment, the first signal is transmitted through a radio interface.

In one embodiment, the first signal is transmitted through a PC5 interface.

In one embodiment, the first signal is transmitted through a Uu interface.

In one embodiment, the first signal is transmitted via sidelink.

In one embodiment, the first signal is transmitted through a Sidelink Shared Channel (SL-SCH).

In one embodiment, the first signal is transmitted through a PSSCH.

In one embodiment, the first signal is transmitted through a Physical Uplink Shared Channel (PUSCH).

In one embodiment, all or part of a Transport Block is used to generate the first radio signal.

In one embodiment, the second signal is a baseband signal.

In one embodiment, the second signal is an RF signal.

In one embodiment, the second signal is transmitted through an air interface.

In one embodiment, the second signal is transmitted through a radio interface.

In one embodiment, the second signal is transmitted through a PC5 interface.

In one embodiment, the second signal is transmitted through a Uu interface.

In one embodiment, the second signal is transmitted via sidelink.

In one embodiment, the second signal is transmitted through a PSFCH.

In one embodiment, all or part of a characteristic sequence is used to generate the second signal.

In one embodiment, the second signal carries all or part of Sidelink Feedback Control Information (SFCI).

In one embodiment, the second signal carries a HARQ feedback.

In one embodiment, the second signal carries a HARQ Non-Acknowledge (NACK) feedback.

In one embodiment, the above phrase of "monitoring a second signal" is realized by performing an energy detection on the second signal.

In one embodiment, the above phrase of "monitoring a second signal" is realized by performing a sequence detection on the second signal.

In one embodiment, the above phrase of "monitoring a second signal" is realized by performing an energy detection and a sequence detection on the second signal.

In one embodiment, the above phrase of "monitoring a second signal" includes the following meaning: whether the second signal is transmitted is monitored.

In one embodiment, the above phrase of "monitoring a second signal" includes the following meaning: whether the second signal carries a characteristic sequence is monitored.

In one embodiment, the above phrase of "the second signal being used to determine that the first signal is not correctly received" includes the following meaning: the second signal is used by the first communication node in the present disclosure to determine that the first signal is not correctly received.

In one embodiment, the above phrase of "the second signal being used to determine that the first signal is not correctly received" includes the following meaning: the second signal is used to directly indicate that the first signal is not correctly received.

In one embodiment, the above phrase of "the second signal being used to determine that the first signal is not correctly received" includes the following meaning: the second signal is used to indirectly indicate that the first signal is not correctly received.

In one embodiment, the above phrase of "the second signal being used to determine that the first signal is not correctly received" includes the following meaning: the second signal is used to explicitly indicate that the first signal is not correctly received.

In one embodiment, the above phrase of "the second signal being used to determine that the first signal is not correctly received" includes the following meaning: the second signal is used to implicitly indicate that the first signal is not correctly received.

In one embodiment, the above phrase of "the second signal being used to determine that the first signal is not correctly received" includes the following meaning: the second signal determines that the first signal is not correctly received by whether it is detected.

In one embodiment, the above phrase of "the second signal being used to determine that the first signal is not correctly received" includes the following meaning: when the second signal is detected, the first communication node assumes that the first signal is not correctly received, otherwise the first communication node assumes that the first signal is correctly received.

In one embodiment, the first signal being not correctly received refers to: the first signal is not correctly decoded.

In one embodiment, the first signal being not correctly received refers to: channel decoding performed on the first signal fails.

In one embodiment, the first signal is not correctly received, which means: the first communication node in the present disclosure assumes that the first signal is not correctly received.

In one embodiment, the first signal is not correctly received, which means: a CRC check of the first signal after channel decoding fails.

In one embodiment, the first signal is not correctly received, which means: A Code Block (CB)-level CRC check of a CB carried by the first signal after channel decoding fails.

In one embodiment, the first signal is not correctly received, which means: A Transport Block (TB)-level CRC check of a TB carried by the first signal after channel decoding fails.

In one embodiment, a geographic location of the first communication node is a current geographic location of the first communication node.

In one embodiment, a geographic location of the first communication node is a current geographic location of the first communication node assumed by the first communication node.

In one embodiment, a geographic location of the first communication node is a current geographic location acquired by the first communication node through measurement.

In one embodiment, a geographic location of the first communication node is a current actual geographic location of the first communication node.

In one embodiment, a geographic location of the first communication node is a geographic location other than a current actual geographic location of the first communication node.

In one embodiment, a geographic location of the first communication node is a current geographic location acquired by the first communication node through positioning.

In one embodiment, a geographic location of the first communication node is a current geographic location acquired by the first communication node through satellite positioning.

In one embodiment, a geographic location of the first communication node is a current geographic location acquired by the first communication node through satellite positioning and measurement.

In one embodiment, a geographic location of the first communication node is assumed by the first communication node a latitude distance and a longitude distance between the first communication node and coordinate points (0,0) in the WGS84 model (Military Standard WGS84 Metric MIL-STD-2401 (11 Jan. 1994): "Military Standard Department of Defence World Geodetic System (WGS)").

In one embodiment, the first zone is a geographically continuous zone occupying a contiguous latitude range and a contiguous longitude range.

In one embodiment, the first zone occupies a continuous latitude interval and a continuous longitude interval.

In one embodiment, according to the WGS84 model, the first zone is a zone enclosed by a rectangle.

In one embodiment, the first zone is a zone on the surface of the earth.

In one embodiment, when a contiguous latitude range and a contiguous accuracy range occupied by the first zone are far less than a radius of the earth, the first zone can be regarded as a zone enclosed by a rectangle.

In one embodiment, the first zone is a circular zone.

In one embodiment, the first zone is a zone on the surface of the earth enclosed by points of equal distance centered on a geographic location.

In one embodiment, the first zone is a continuous zone on the surface of the earth.

In one embodiment, the first zone is one of zones in which the surface of the earth is divided from coordinate points (0,0) in the WGS84 model (Military Standard WGS84 Metric MIL-STD-2401 (11 Jan. 1994): "Military Standard Department of Defence World Geodetic System (WGS)") with equal latitude interval and equal longitude interval.

In one embodiment, a geographic location of the first communication node belongs to the first zone.

In one embodiment, the first communication node is located within the first zone.

In one embodiment, the first communication node is located outside the first zone.

In one embodiment, the first communication node assumes that the first communication node is located within the first zone.

In one embodiment, the above phrase of "a geographic location of the first communication node being used to determine a first zone" includes the following meaning: the first communication node is located within the first zone or on an edge of the first zone.

In one embodiment, the above phrase of "a geographic location of the first communication node being used to determine a first zone" includes the following meaning: the first zone comprises a geographic location of the first communication node.

In one embodiment, the above phrase of "a geographic location of the first communication node being used to determine a first zone" includes the following meaning: a geographic location of the first communication node is used by the first communication node in the present disclosure to determine the first zone.

In one embodiment, the above phrase of "a geographic location of the first communication node being used to determine a first zone" includes the following meaning: a geographic location of the first communication node is used to determine the ID of the first zone.

In one embodiment, the above phrase of "a geographic location of the first communication node being used to determine a first zone" includes the following meaning: a geographic location of the first communication node is used to determine the ID of the first zone based on a functional relation.

In one embodiment, an ID of the first zone is an ID of the first zone.

In one embodiment, an ID of the first zone is an index of the first zone.

In one embodiment, an ID of the first zone is a sequence number of the first zone.

In one embodiment, an ID of the first zone is used to identify the first zone.

In one embodiment, an ID of the first zone is a non-negative integer.

In one embodiment, an ID of the first zone is an integer.

In one embodiment, the above phrase of "an ID of the first zone being used to determine the first ID" includes the following meaning: the first ID is an ID of the first zone.

In one embodiment, the above phrase of "an ID of the first zone being used to determine the first ID" includes the following meaning: the first ID is equal to an ID of the zone.

In one embodiment, the above phrase of "an ID of the first zone being used to determine the first ID" includes the following meaning: the first ID is determined by an ID of the first zone through an operating function.

In one embodiment, the above phrase of "an ID of the first zone being used to determine the first ID" includes the following meaning: the first ID is determined by an ID of the first zone through a mapping relation.

In one embodiment, the above phrase of "an ID of the first zone being used to determine the first ID" includes the following meaning: an ID of the first zone is represented by K bits, K being a positive integer greater than 1, the first ID is represented through K1 bit(s), and the K1 bit(s) is(are) K1 Most Significant Bit(s) (MSB) among the K bits, K1 being a positive integer not greater than K.

In one embodiment, the above phrase of "an ID of the first zone being used to determine the first ID" includes the following meaning: an ID of the first zone is represented by K bits, K being a positive integer greater than 1, the first ID is represented through K2 bit(s), and the K2 bit(s) is(are) K2 Least Significant Bit(s) (LSB) among the K bits, K2 being a positive integer not greater than K.

In one embodiment, the first characteristic geographic location is located within the first zone.

In one embodiment, the first characteristic geographic location is a central location of the first zone.

In one embodiment, the first characteristic geographic location is a location on the edge of the first zone.

In one embodiment, the first characteristic geographic location is a geographic location farthest from a central location in the first zone.

In one embodiment, the first characteristic geographic location is a geographic location where a central longitude line in a longitude interval occupied by the first zone meets a central latitude line in a latitude interval occupied by the first zone.

In one embodiment, the first characteristic geographic location is a geographic location outside a central location of the first zone.

In one embodiment, the first characteristic geographic location is a geographic location outside a geographic location where a central longitude line in a longitude interval occupied by the first zone meets a central latitude line in a latitude interval occupied by the first zone.

In one embodiment, a relative location of the first characteristic geographic location in the first zone is predefined.

In one embodiment, a relative location of the first characteristic geographic location in the first zone is fixed.

In one embodiment, for given the first zone, the first characteristic geographic location is fixed.

In one embodiment, a relative location of the first characteristic geographic location in the first zone is configured.

In one embodiment, a distance between a geographic location of the first communication node and the first characteristic geographic location is a geodesic distance between a geographic location of the first communication node and the first characteristic geographic location.

In one embodiment, a distance between a geographic location of the first communication node and the first characteristic geographic location is a geodesic distance between a geographic location of the first communication node and the first characteristic geographic location.

In one embodiment, a distance between a geographic location of the first communication node and the first characteristic geographic location is represented by a geographic distance.

In one embodiment, a distance between a geographic location of the first communication node and the first characteristic geographic location is a 2D geographic distance.

In one embodiment, a distance between a geographic location of the first communication node and the first characteristic geographic location is a 3D geographic distance.

In one embodiment, a distance between a geographic location of the first communication node and the first characteristic geographic location is measured by m.

In one embodiment, a distance between a geographic location of the first communication node and the first characteristic geographic location is represented by a transmission delay of a radio signal.

In one embodiment, the above phrase of "a distance between a geographic location of the first communication node and the first characteristic geographic location being used to determine the first distance" includes the following meaning: a distance between a geographic location of the first communication node and the first characteristic geographic location is used by the first communication node in the present disclosure to determine the first distance.

In one embodiment, the above phrase of "a distance between a geographic location of the first communication node and the first characteristic geographic location being used to determine the first distance" includes the following meaning: a distance between a geographic location of the first communication node and the first characteristic geographic location is used to directly determine the first distance.

In one embodiment, the above phrase of "a distance between a geographic location of the first communication node and the first characteristic geographic location being used to determine the first distance" includes the following meaning: a distance between a geographic location of the first communication node and the first characteristic geographic location is used to indirectly determine the first distance.

In one embodiment, the above phrase of "a distance between a geographic location of the first communication node and the first characteristic geographic location being used to determine the first distance" includes the following meaning: the first distance is in a linear correlation with a distance between a geographic location of the first communication node and the first characteristic geographic location.

In one embodiment, the above phrase of "a distance between a geographic location of the first communication node and the first characteristic geographic location being used to determine the first distance" includes the following meaning: the first distance is in a linear positive correlation with a distance between a geographic location of the first communication node and the first characteristic geographic location.

In one embodiment, the above phrase of "a distance between a geographic location of the first communication node and the first characteristic geographic location being used to determine the first distance" includes the following meaning: the first distance is in a linear negative correlation with a distance between a geographic location of the first communication node and the first characteristic geographic location.

In one embodiment, the above phrase of "a distance between a geographic location of the first communication node and the first characteristic geographic location being used to determine the first distance" includes the following meaning: the first distance is in a linear correlation with a distance between a geographic location of the first communication node and the first characteristic geographic location, and a coefficient of the linear correlation is equal to 1.

In one embodiment, the above phrase of "a distance between a geographic location of the first communication node and the first characteristic geographic location being used to determine the first distance" includes the following meaning: a geographic location of the first communication node and a first characteristic geographic location is equal to a difference value between the first distance and a second distance, and the second distance is transferred from a higher layer to a physical layer of the first communication node.

In one embodiment, the above phrase of "a distance between a geographic location of the first communication node and the first characteristic geographic location being used to determine the first distance" includes the following meaning: a difference value between a geographic location of the first communication node and the first characteristic geographic location is equal to a difference value between the first distance and a second distance, and the second distance is configured or pre-configured.

In one embodiment, the above phrase of "a distance between a geographic location of the first communication node and the first characteristic geographic location being used to determine the first distance" includes the following meaning: a sum of a distance between a geographic location of the first communication node and the first characteristic geographic location plus a first distance margin is equal to a difference value between the first distance and a second distance, the second distance is configured or pre-configured, and the first distance margin is pre-defined or fixed.

In one embodiment, the above phrase of "a distance between a geographic location of the first communication node and the first characteristic geographic location being used to determine the first distance" includes the following meaning: a sum of a distance between a geographic location of the first communication node and the first characteristic geographic location plus a first distance margin is equal to a difference value between the first distance and a second distance, the second distance is configured or pre-configured, and the first distance margin is configured or pre-configured.

In one embodiment, when the second signal is not detected, the first communication node assumes that the first signal is correctly received.

In one embodiment, when the second signal is not detected, the first communication node assumes that the first signal is correctly received by any receiver of the first signal with a distance between its geographic location and the first characteristic location not greater than the first distance.

In one embodiment, when the second signal is not detected, the first communication node assumes that the first signal is correctly received by M receiver(s), and a distance between a geographic location of any of the M receiver(s) and the first characteristic geographic location is not greater than the first distance, M being an integer not less than 0.

In one embodiment, when the second signal is not detected, the first communication node assumes that all receivers of the first signal do not transmit the second signal.

In one embodiment, when the second signal is not detected, the first communication node assumes that the first signal is correctly received or the first signaling is not correctly received.

Embodiment 2

Figure 2:
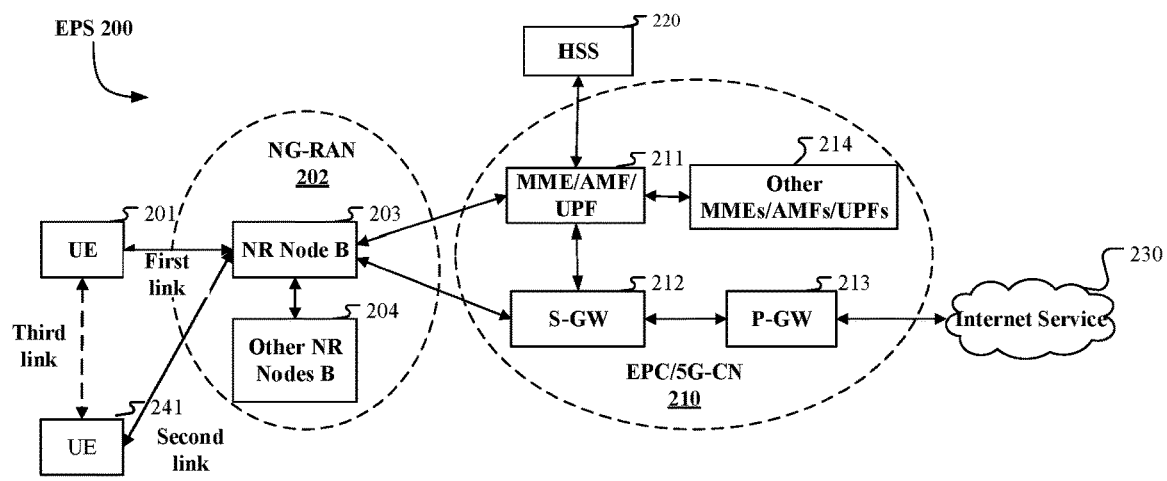
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LIE), and Long-Term Evolution Advanced (LIE-A) systems. The 5G NR or LIE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an SING interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first communication node in the present disclosure.

In one embodiment, the UE 201 supports transmission in sidelink.

In one embodiment, the UE 201 supports a PC5 interface.

In one embodiment, the UE 201 supports Internet of Vehicles.

In one embodiment, the UE 201 supports V2X services.

In one embodiment, the UE 241 corresponds to the second communication node in the present disclosure.

In one embodiment, the UE 241 supports transmission in sidelink.

In one embodiment, the UE 241 supports a PC5 interface.

In one embodiment, the UE 241 supports Internet of Vehicles.

In one embodiment, the UE 241 supports V2X services.

In one embodiment, the third link is a sidelink.

In one embodiment, the third link is communicated through a PC5 interface.

In one embodiment, the first communication node is in-coverage.

In one embodiment, the first communication node is out-of-coverage.

In one embodiment, the second communication node is in-coverage.

In one embodiment, the second communication node is out-of-coverage.

In one embodiment, the first communication node and the second communication node are in-coverage of a same cell.

In one embodiment, the first communication node and the second communication node are in-coverage of different cells.

Embodiment 3

Figure 3:
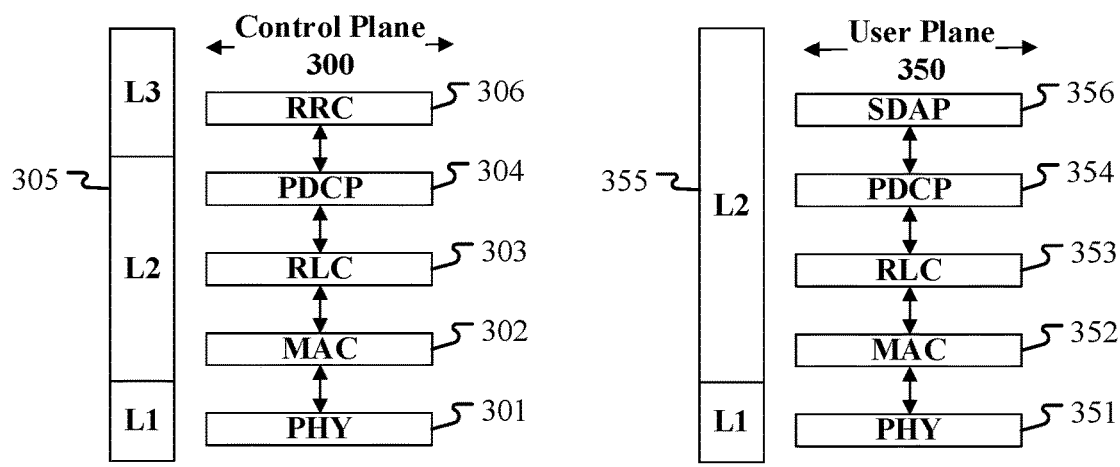
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating a radio protocol architecture of a user plane 350 and a control plane 300. In FIG. 3, the radio protocol architecture for a control plane 300 between a first communication node (UE or vehicle devices or vehicle communication modules in V2X) and a second communication node (UE or vehicle devices or vehicle communication modules in V2X), and between the first communication node or the second communication node and a base station of a corresponding serving cell_is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of links between the first communication node and the second communication node, as well as between the first communication node or the second communication node and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. The PDCP sublayer 304 provides multiplexing among variable radio bearers and logical channels. The PDCP sublayer 304 provides security by encrypting a packet and provides support for the first communication node or the second communication node handover between base stations. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between the first communication node and the second communication node various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring a lower layer with an RRC signaling between the base station and the first communication node (or the first communication node and the second communication node). The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the base station may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the MAC 302 or the MAC 352.

In one embodiment, the second signal in the present disclosure is generated by the PHY 301 or the PHY 351.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

Embodiment 4

Figure 4:
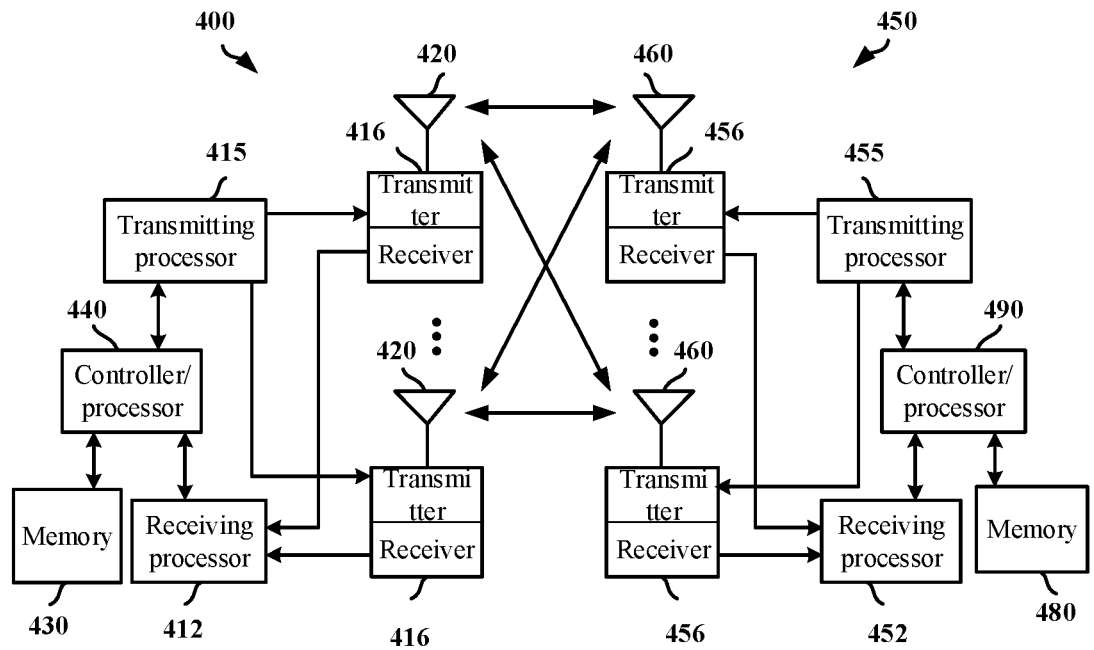
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (400) comprises a controller/processor 440, a memory 430, a receiving processor 412, a transmitter/receiver 416, an antenna 420 and a transmitting processor 415. A higher layer packet is provided to the controller/processor 440 by the data source, the controller/processor 440 provides header compression, encryption, packet segmentation and reordering, and a multiplexing between a logical channel and a transport channel so as to implement the L2 layer protocols; the higher layer packet may comprise data or control information, such as a SL-SCH; the transmitting processor 415 performs various signal transmitting processing functions used for the L1 layer (that is, PHY), including coding, interleaving, scrambling, modulation, power control/allocation and generation of physical layer control signaling. The receiving processor 412 performs various signal receiving processing functions used for the L1 layer (that is, PHY), including decoding, deinterleaving, descrambling, demodulation, deprecoding and extraction of physical layer control signaling. The transmitter 416 is configured to convert a baseband signal provided by the transmitting processor 415 into an RF signal to be transmitted via the antenna 420. The receiver 416 converts the RF signal received via the antenna 420 into a baseband signal and provides the baseband signal to the receiving processor 412. The composition in the second communication node device (450) is the same as that in the first communication node device 400.

In sidelink transmission, a higher packet (such as a first signal in the present disclosure) is provided to the controller/processor 440, which implements function of L2 layer, in particular, the target distance in the present disclosure is provided from above the L2 layer to the L2 layer or to L1 layer, and the controller/processor 440 performs a determination of the target distance. In sidelink transmission, the controller/processor 440 provides header compression, encryption, packet segmentation and reordering, and multiplexing between a logical channel and a transport channel. The controller/processor 440 is also responsible for HARQ operation (if supported), repeat transmission, and a signaling to the UE 450 (including second information in the present disclosure). The transmitting processor 415 implements various signal processing functions on the L1 layer (i.e., physical layer), including coding, interleaving, scrambling, modulation, power control/distribution, precoding, and generation of a physical-layer control signaling, etc. The generation of a first signaling, second information and a physical-layer signal of a first signal in the present disclosure are completed by the transmitting processor 415, and the transmitting processor 415 divides the modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function includes receiving a first signaling, second information and a first signal in the present disclosure, demodulating based on various modulation schemes (e.g., BPSK, and QPSK) via a multicarrier symbol in a multicarrier symbol stream, then descrambling, decoding and deinterleaving to recover a data or a control signal transmitted by the first communication node 400 on a physical channel, and providing the data and the control signal to the controller/processor 490. The controller/processor 490 implements the functionality of the L2 layer, the controller/processor 490 interprets the first signal and the first information of the present disclosure. The controller/processor can be connected to a memory 480 that stores program code and data. The memory 480 may be called a computer readable medium. In particular, for the monitoring of a second signal in the present disclosure, in the UE 400, each receiver 416 receives a radio-frequency signal of the second signal monitored via the corresponding antenna 420, each receiver 416 recovers baseband information modulated into a radio-frequency carrier, and supplies the baseband information to the receiving processor 412, and the receiving processor 412 determines whether the second signal in the present disclosure is detected or not. when the second signal is transmitted, the second signal is generated in the transmitting processor 455 in the UE 450, then mapped to the antenna 460 via the transmitter 456, and transmitted in the form of a radio-frequency signal.

In one embodiment, the first communication node (400) comprises: at least one processor and at least one memory. The at least one memory comprises computer program codes; the at least one memory and the computer program codes are configured to be used in collaboration with the at least one processor. The first communication node (400) at least: transmits a first signaling, the first signaling is used to indicate a first ID and a first distance; transmits a first signal, the first signaling is used to indicate time-frequency resources occupied by the first signal; and monitors a second signal, the second signal is used to determine that the first signal is not correctly received; herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

In one embodiment, the first communication node (400) comprises: a memory that stores a computer readable instruction program. The computer readable instruction program generates an action when executed by at least one processor. The action includes: transmitting a first signaling, the first signaling being used to indicate a first ID and a first distance; transmitting a first signal, the first signaling also being used to indicate time-frequency resources occupied by the first signal; and monitoring a second signal, the second signal being used to determine that the first signal is not correctly received; herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

In one embodiment, the second communication node (450) comprises: at least one processor and at least one memory. The at least one memory comprises computer program codes; the at least one memory and the computer program codes are configured to be used in collaboration with the at least one processor. The second communication node (450) at least: receives a first signaling, the first signaling is used to determine a first ID and a first distance; receives a first signal, the first signaling is also used to determine time-frequency resources occupied by the first signal; and transmits a second signal, or drops transmitting the second signal, the second signaling is used to determine that the first signal is not correctly received; herein, the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

In one embodiment, the transmitter 416 (including the antenna 420), the transmitting processor 415 and the controller/processor 440 are used to transmit the first signaling in the present disclosure.

In one embodiment, the transmitter 416 (including the antenna 420) and the transmitting processor 415 are used to transmit the first signaling in the present disclosure.

In one embodiment, the transmitter 416 (including the antenna 420), the transmitting processor 415 and the controller/processor 440 are used to transmit the first signal in the present disclosure.

In one embodiment, the receiver 416 (including the antenna 420) and the receiving processor 412 are used to monitor the second signal in the present disclosure.

In one embodiment, the transmitter 416 (including the antenna 420), the transmitting processor 415 and the controller/processor 440 are used to transmit the second information in the present disclosure.

In one embodiment, the receiver 456 (including the antenna 460), the receiving processor 452 and the controller/processor 490 are used to receive the first signaling in the present disclosure.

In one embodiment, the receiver 456 (including the antenna 460) and the receiving processor 452 are used to receive the first signaling in the present disclosure.

In one embodiment, the receiver 456 (including the antenna 460), the receiving processor 452 and the controller/processor 490 are used to receive the first signal in the present disclosure.

In one embodiment, the transmitter 456 (including the antenna 460), and the transmitting processor 455 are used to transmit the second signal in the present disclosure.

In one embodiment, the receiver 456 (including the antenna 460), the receiving processor 452 and the controller/processor 490 are used to receive the second information in the present disclosure.

Embodiment 5

Figure 5:
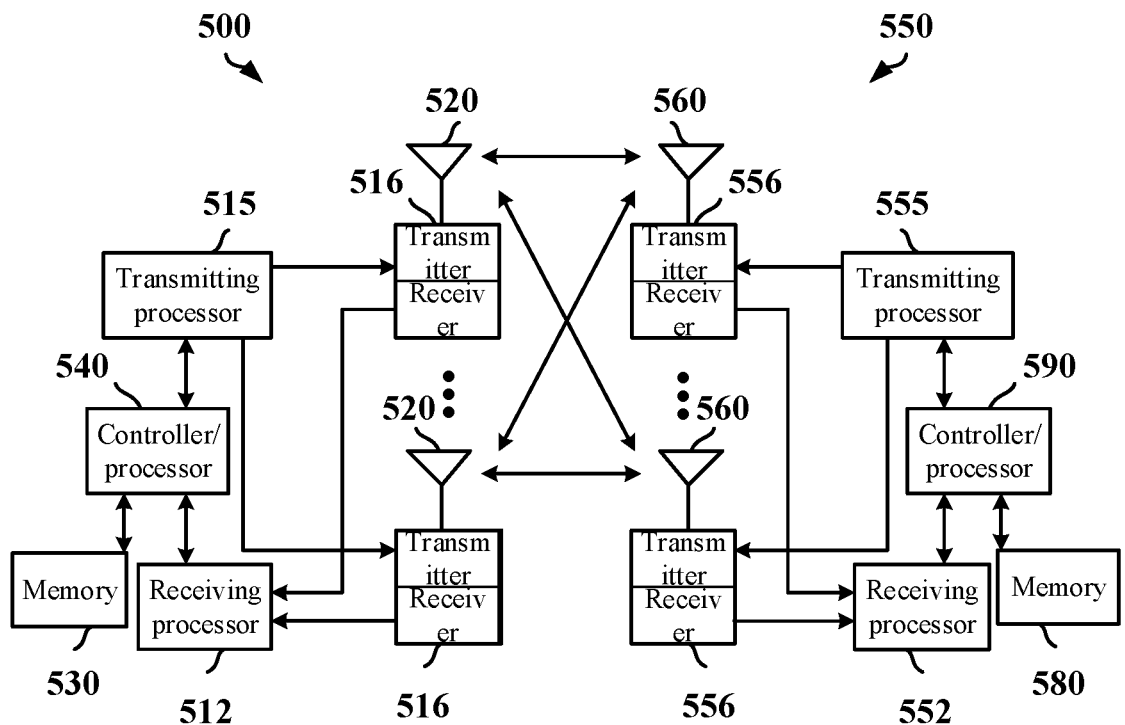
FIG. 5 illustrates a schematic diagram of a first communication node and a third communication node according to one embodiment of the present disclosure.

Embodiment 5 illustrates a schematic diagram of a first communication node and a base station of a serving cell of a first communication node in the present disclosure, as shown in FIG. 5.

The first communication node (550) comprises a controller/processor 590, a memory 580, a receiving processor 552, a transmitter/receiver 556, and a transmitting processor 555, the transmitter/receiver 556 comprising an antenna 560. A higher layer packet is provided to the controller/processor 590 by the data source, the controller/processor 590 provides header compression, encryption, packet segmentation and reordering, and a multiplexing between a logical channel and a transport channel so as to implement the L2 layer protocols used for the user plane and the control plane; the higher layer packet may comprise data or control information, such as DL-SCH, UL-SCH or SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter 556 is configured to convert a baseband signal provided by the transmitting processor 555 into an RF signal to be transmitted via the antenna 560, the receiver 556 is configured to convert the RF signal received via the antenna 560 into a baseband signal to be provided to the receiving processor 552.

The base station (500) in the serving cell of the first communication node may comprise a controller/processor 540, a receiving processor 512, a transmitter/receiver 516 and a transmitting processor 515, a transmitter/receiver 516 comprising an antenna 520. A higher layer packet is provided to the controller/processor 540, the controller/processor 540 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH. The transmitting processor 515 performs various signal transmitting processing functions used for the L1 layer (that is, PHY), including coding, interleaving, scrambling, modulation, power control/allocation, precoding and generation of physical layer signalings (including a synchronization signal, a reference signal and etc.). The receiving processor 512 performs various signal receiving processing functions used for the L1 layer (that is, PHY), including decoding, deinterleaving, descrambling, demodulation, deprecoding and extraction of physical layer signaling. The transmitter 516 is used to convert a baseband signal provided by the transmitting processor 515 into a radio-frequency signal and transmit it via the antenna 520, and the receiver 516 is used to convert the radio-frequency signal received via the antenna 520 into a baseband signal and provide it to the receiving processor 512.

In Downlink (DL) transmission, a higher layer packet (for example, higher layer information comprised in the first information in the present disclosure) is provided to the controller/processor 540. if the first communication node and the second communication are located in a same serving cell, higher layer information comprised in the third information in the present disclosure is also provided to the controller/processor 540, and if the first communication node and the second communication node are located in different serving cells, the third information is provided to a corresponding device of the base station of the serving cell of the second communication node to be generated or is generated inside the second communication node. The controller/processor 540 implements functions of L2 layer. In DL, the controller/processor 475 provides header compression, encryption, packet segmentation and reordering, multiplexing between a logical channel and a transport channel, and radio resource allocation for the first communication node 550 and the second communication node in the present disclosure (if the first communication node and the second communication node are located in a same serving cell) based on various priorities. The controller/processor 540 is also in charge of HARQ operation, retransmission of a lost packet, and a signaling to the first communication node 550 and the second communication node in the present disclosure (if the first communication node and the second communication node are located in a same serving cell), for example, the first information in the present disclosure (if the first communication node and the second communication node are located in a same serving cell, and the third information is also comprised) is generated in the controller/processor 540. The transmitting processor 515 implements various signal processing functions for L1 layer (i.e. physical layer), including encoding, interleaving, scrambling, modulation, power control/distribution, precoding and the generation of a physical-layer control signaling, etc. The generation of a physical-layer signal carrying first information (if the first communication node and the second communication node are located in a same serving cell, and the third information is also comprised) in the present disclosure are completed at transmitting processor 515. The transmitting processor 515 divides modulation symbols into parallel streams and maps each stream to the corresponding multi-carrier sub-carriers and/or multi-carrier symbols, which is then mapped by the transmitting processor 515 to the antenna 520 via the transmitter 516 and transmitted in the form of radio-frequency signals. The first information in the present disclosure (if the first communication node and the second communication node are located in a same serving cell, and the third information is also comprised) is mapped to target air interface resources by the transmitting processor 515 in a corresponding channel of the physical layer and transmitted in the form of radio-frequency signal by the transmitter 516 mapped to the antenna 520. At the receiving side, each receiver 556 receives an RF signal via a corresponding antenna 560, each receiver 556 recovers baseband information modulated to the RF carrier and provides the baseband information to the receiving processor 552. The receiving processor 552 performs signal receiving processing functions of the L1 layer. The signal receiving and processing function includes receiving a physical layer signal of the first information in the present disclosure (the third information is received in a corresponding device in the second communication node), demodulating based on various modulation schemes (e.g., BPSK, and QPSK) via a multicarrier symbol in a multicarrier symbol stream, then descrambling, decoding and deinterleaving to recover data or a control signal transmitted by the base station (500) of the serving cell of the first communication node on a physical channel, and providing the data and the control signal to the controller/processor 590. The controller/processor 590 implements the functionality of the L2 layer, the controller/processor 590 interprets the first information of the present disclosure. The controller/processor can be connected to a memory 580 that stores program code and data. The memory 580 may be called a computer readable medium.

In one embodiment, the receiver 556 (including the antenna 560), the receiving processor 552 and the controller/processor 590 are used to receive the first information in the present disclosure.

In one embodiment, the transmitter 516 (including the antenna 520), the transmitting processor 515 and the controller/processor 540 are used to transmit the first information in the present disclosure.

Embodiment 6

Figure 6:
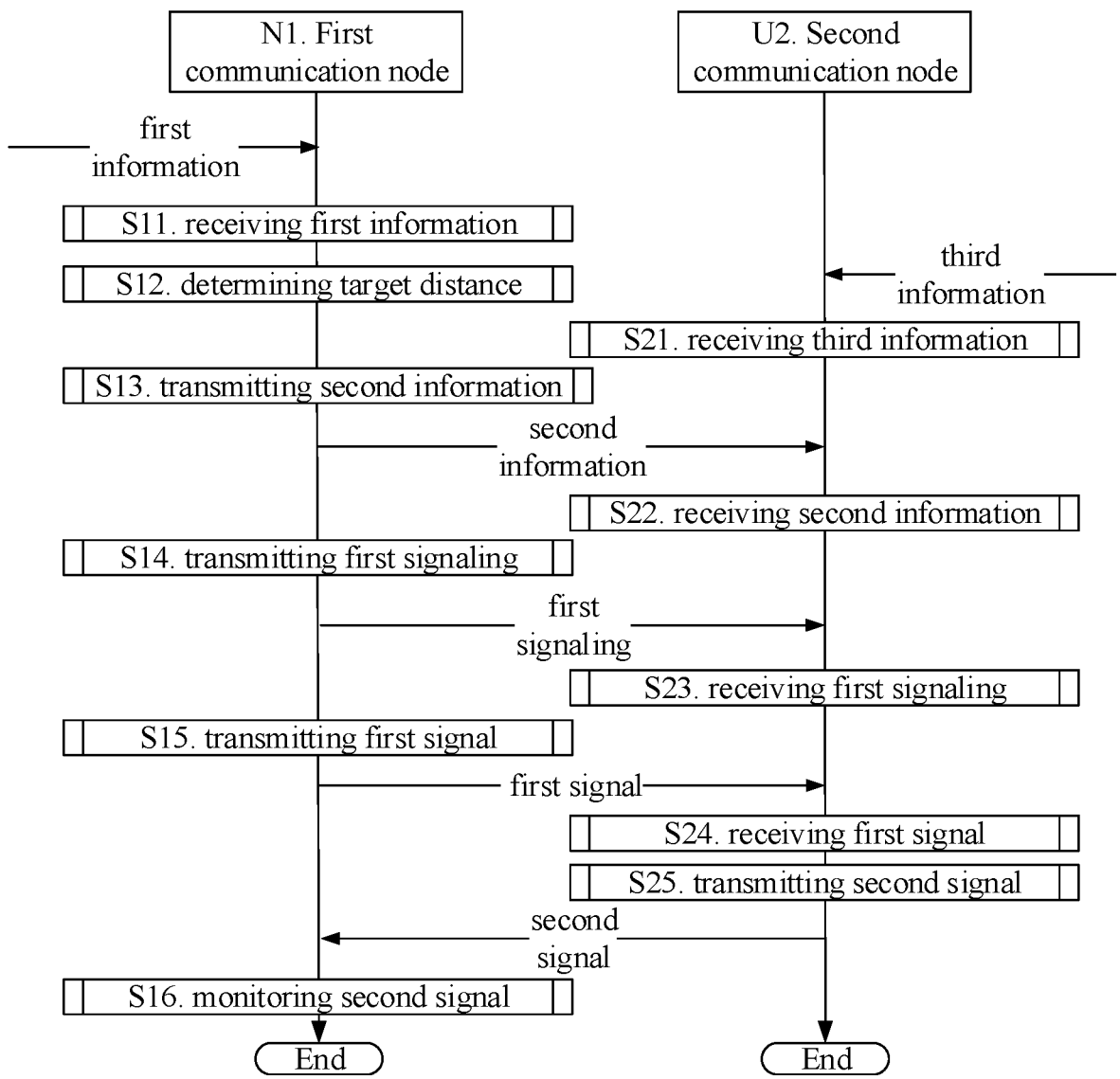
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second communication node N1 and a second communication node U2 are in communications via sidelink.

The first communication node N1 receives first information in step S11, determines a target distance in step S12, transmits second information in step S13, transmits a first signaling in step S14, transmits a first signal in step S15, and monitors a second signal in step S16.

The second communication node U2 receives third information in step S21, receives second information in step S22, receives a first signaling in step S23, receives a first signal in step S24, and transmits a second signal in step S25.

In embodiment 6, the first signaling is used to indicate a first ID and a first distance; the first signaling is also used to indicate time-frequency resources occupied by the first signal; the second signal is used to determine that the first signal is not received correctly; a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance; a distance between a geographic location of the first communication node and the first characteristic geographic distance is used to determine a difference value between the first distance and the target distance; the first information is used to determine a first length, a first width, a first longitude reusing factor and a first latitude reusing factor, the first length and the first width are used to determine Y zones, and the first zone is one of the Y zones, Y being a positive integer greater than 1; a geographic location of the first communication node is located within the first zone; and the first longitude reusing factor and the first latitude reusing factor are used together to determine the ID of the first zone; the second information is used to indicate the first length, the first width, the first longitude reusing factor and the first latitude reusing factor; the third information is used to determine a second length and a second width, a geographic location of the second communication node, the second length and the second width are used together to determine a second zone, and the reference geographic location is a predefined geographic location within the second zone.

In one embodiment, the first information is transmitted through an air interface.

In one embodiment, the first information is transmitted through a radio interface.

In one embodiment, the first information is transmitted through a PC5 interface.

In one embodiment, the first information is transmitted through a Uu interface.

In one embodiment, the first information is transmitted via sidelink.

In one embodiment, the first information is carried by a baseband signal.

In one embodiment, the first information is carried by an RF signal.

In one embodiment, the first information comprises physical-layer information.

In one embodiment, the first information comprises dynamic information.

In one embodiment, the first information is semi-persistent information.

In one embodiment, the first information comprises all or partial information in a System Information Block (SIB).

In one embodiment, the first information comprises all or part of an RRC signaling.

In one embodiment, the first information is cell specific/cell common.

In one embodiment, the first information is UE specific/dedicated.

In one embodiment, the first information is zone-specific.

In one embodiment, the first information is broadcast.

In one embodiment, the first information is unicast.

In one embodiment, the first information comprises all or partial fields of Downlink Control Information (DCI).

In one embodiment, the first information is carried through a Downlink Shared Channel (DL-SCH).

In one embodiment, the first information is carried through a Physical Downlink Shared Channel (PDSCH).

In one embodiment, the first information is carried through a Sidelink Shared Channel (SL-SCH).

In one embodiment, the first information is carried through a PSSCH.

In one embodiment, the first information is carried through a Physical Downlink Control Channel (PDCCH).

In one embodiment, the above phrase of "the first information being used to determine a first length, a first width, a first longitude reusing factor and a first latitude reusing factor" includes the following meaning: the first information is used by the first communication node in the present disclosure to determine the first length, the first width, the first longitude reusing factor and the first latitude reusing factor.

In one embodiment, the above phrase of "the first information being used to determine a first length, a first width, a first longitude reusing factor and a first latitude reusing factor" includes the following meaning: the first information is used to directly indicate the first length, the first width, the first longitude reusing factor and the first latitude reusing factor.

In one embodiment, the above phrase of "the first information being used to determine a first length, a first width, a first longitude reusing factor and a first latitude reusing factor" includes the following meaning: the first information is used to indirectly indicate the first length, the first width, the first longitude reusing factor and the first latitude reusing factor.

In one embodiment, the above phrase of "the first information being used to determine a first length, a first width, a first longitude reusing factor and a first latitude reusing factor" includes the following meaning: the first information is used to explicitly indicate the first length, the first width, the first longitude reusing factor and the first latitude reusing factor.

In one embodiment, the above phrase of "the first information being used to determine a first length, a first width, a first longitude reusing factor and a first latitude reusing factor" includes the following meaning: the first information is used to implicitly indicate the first length, the first width, the first longitude reusing factor and the first latitude reusing factor.

In one embodiment, the third information is transmitted through an air interface.

In one embodiment, the third information is transmitted through a radio interface.

In one embodiment, the third information is transmitted through a Uu interface.

In one embodiment, the third information is transmitted through a PC5 interface.

In one embodiment, the third information comprises physical-layer information.

In one embodiment, the third information comprises dynamic information.

In one embodiment, the third information comprises semi-persistent information.

In one embodiment, the third information comprises a System Information Block (SIB).

In one embodiment, the third information is carried by an RRC signaling.

In one embodiment, the third information comprises all or part of an RRC signaling.

In one embodiment, the third information is cell specific/cell common.

In one embodiment, the third information is UE specific/dedicated.

In one embodiment, the third information comprises all or partial fields of Downlink Control Information (DCI).

In one embodiment, the third information is carried through a Downlink Shared Channel (DL-SCH).

In one embodiment, the third information is carried through a Physical Downlink Shared Channel (PDSCH).

In one embodiment, the third information is carried through a Sidelink Shared Channel (SL-SCH).

In one embodiment, the third information is carried through a PSSCH.

In one embodiment, the third information is carried through a Physical Downlink Control Channel (PDCCH).

In one embodiment, the above phrase of "the third information being used to determine a second length and a second width" includes the following meaning: the third information is used by the second communication node in the present disclosure to determine the second length and the second width.

In one embodiment, the above phrase of "the third information being used to determine a second length and a second width" includes the following meaning: the third information is used to directly indicate the second length and the second width.

In one embodiment, the above phrase of "the third information being used to determine a second length and a second width" includes the following meaning: the third information is used to explicitly indicate the second length and the second width.

In one embodiment, the above phrase of "the third information being used to determine a second length and a second width" includes the following meaning: the third information is used to implicitly indicate the second length and the second width.

In one embodiment, the above phrase of "the third information being used to determine a second length and a second width" includes the following meaning: the third information is used to indirectly indicate the second length and the second width.

Embodiment 7

Figure 7:
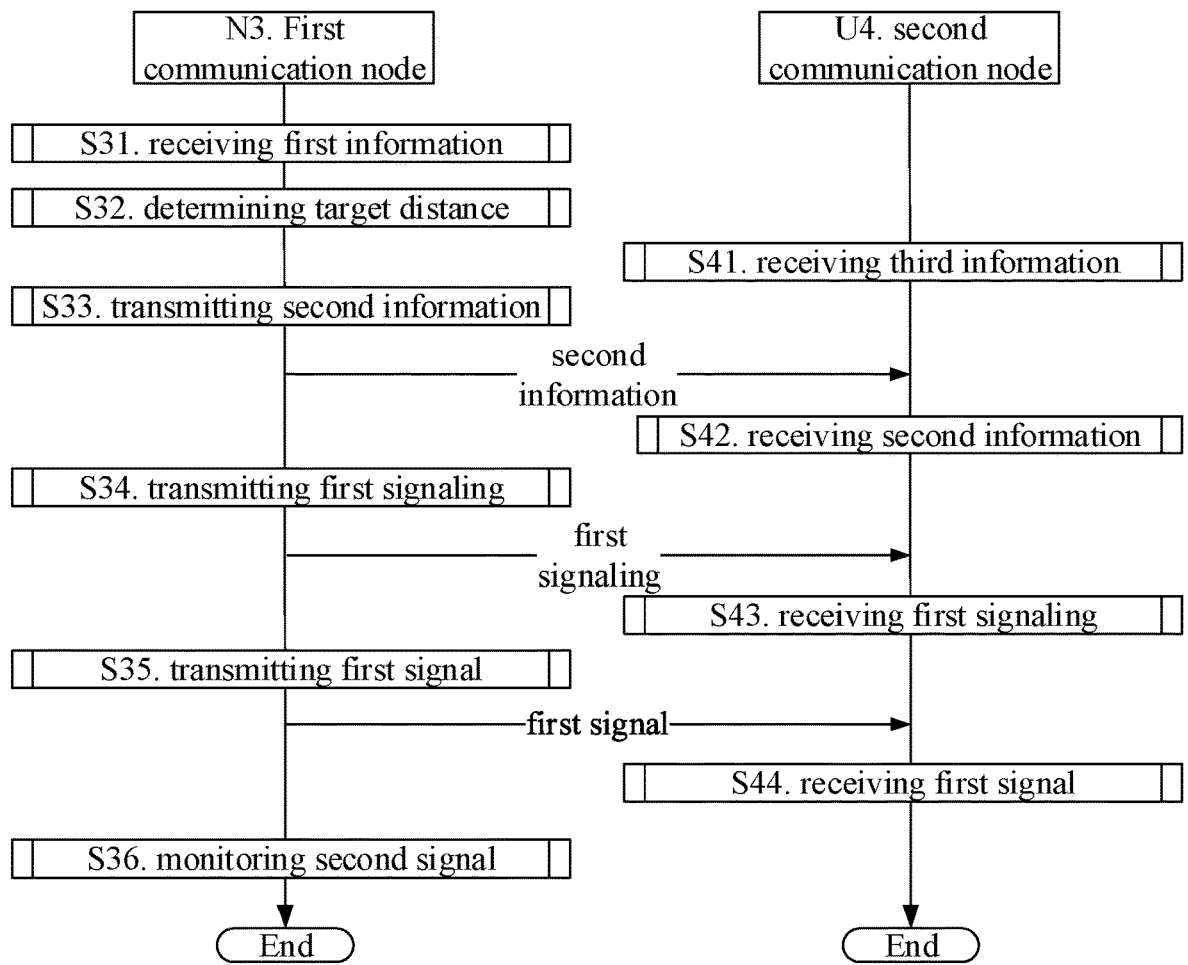
FIG. 7 illustrates a flowchart of radio signal transmission according to another embodiment of the present disclosure.

Embodiment 7 illustrates a flowchart of radio signal transmission according to another embodiment in the present disclosure, as shown in FIG. 7. In FIG. 7, a first communication node N3 and a second communication node U4 are in communications via sidelink.

The first communication node N3 receives first information in step S31, determines a target distance in step S32, transmits second information in step S33, transmits a first signaling in step S34, transmits a first signal in step S35, and monitors a second signal in step S36.

The second communication node U4 receives third information in step S41, receives second information in step S42, receives a first signaling in step S43, and receives a first signal in step S44.

In Embodiment 7, the first signaling is used to indicate a first ID and a first distance; the first signaling is also used to indicate time-frequency resources occupied by the first signal; the second signal is used to determine that the first signal is not received correctly; a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance; a distance between a geographic location of the first communication node and the first characteristic geographic distance is used to determine a difference value between the first distance and the target distance; the first information is used to determine a first length, a first width, a first longitude reusing factor and a first latitude reusing factor, the first length and the first width are used to determine Y zones, and the first zone is one of the Y zones, Y being a positive integer greater than 1; a geographic location of the first communication node is located within the first zone; the first longitude reusing factor and the first latitude reusing factor are used together to determine the ID of the first zone; the second information is used to indicate the first length, the first width, the first longitude reusing factor and the first latitude reusing factor; the third information is used to determine a second length and a second width, a geographic location of the second communication node, the second length and the second width are used together to determine a second zone, and the reference geographic location is a predefined geographic location within the second zone.

In one embodiment, the first information is transferred inside the first communication node.

In one embodiment, the first information comprises higher-layer information, and the first information is transferred from a higher layer of the first communication node to a physical layer of the first communication node.

In one embodiment, the first information is pre-configured.

In one embodiment, the first information comprises all or part of a pre-configured RRC IE.

In one embodiment, the second information is transmitted through an air interface.

In one embodiment, the second information is transmitted through a radio interface.

In one embodiment, the second information is transmitted through a PC5 interface.

In one embodiment, the second information is transmitted through a Uu interface.

In one embodiment, the second information is transmitted via sidelink.

In one embodiment, the second information is carried by a baseband signal.

In one embodiment, the second information is carried by an RF signal.

In one embodiment, the second information is carried via a physical-layer signaling.

In one embodiment, the second information is carried via a higher-layer signaling.

In one embodiment, the second information is broadcast.

In one embodiment, the second information is unicast.

In one embodiment, the second information comprises an SCI.

In one embodiment, the second information comprises partial or all fields in SCI.

In one embodiment, the second information is transmitted through a PSCCH.

In one embodiment, the second information is transmitted through a PSSCH.

In one embodiment, the second information is transmitted through a Physical Sidelink Broadcast Channel (PSBCH).

In one embodiment, the second information is carried by a Sidelink Radio Resource Control (SL RRC).

In one embodiment, the second information comprises all or partial IEs in an RRC signaling.

In one embodiment, the second information comprises all or partial fields in an IE in an RRC signaling.

In one embodiment, a target receiver of the second information is the second communication node in the present disclosure.

In one embodiment, the above phrase of "the second information being used to indicate the first length, the first width, the first longitude reusing factor and the first latitude reusing factor" includes the following meaning: the second information is used by the first communication node in the present disclosure to indicate the first length, the first width, the first longitude reusing factor and the first latitude reusing factor.

In one embodiment, the above phrase of "the second information being used to indicate the first length, the first width, the first longitude reusing factor and the first latitude reusing factor" includes the following meaning: the second information is used to directly indicate the first length, the first width, the first longitude reusing factor and the first latitude reusing factor.

In one embodiment, the above phrase of "the second information being used to indicate the first length, the first width, the first longitude reusing factor and the first latitude reusing factor" includes the following meaning: the second information is used to indirectly indicate the first length, the first width, the first longitude reusing factor and the first latitude reusing factor.

In one embodiment, the above phrase of "the second information being used to indicate the first length, the first width, the first longitude reusing factor and the first latitude reusing factor" includes the following meaning:

the second information is used to explicitly indicate the first length, the first width, the first longitude reusing factor and the first latitude reusing factor.

In one embodiment, the above phrase of "the second information being used to indicate the first length, the first width, the first longitude reusing factor and the first latitude reusing factor" includes the following meaning: the second information is used to implicitly indicate the first length, the first width, the first longitude reusing factor and the first latitude reusing factor.

In one embodiment, the second information is carried by the first signaling.

In one embodiment, the second information is carried by a signaling other than the first signaling.

In one embodiment, the second information is carried by one or several fields in the first signaling.

In one embodiment, the second information is carried by one or several IEs in the first signaling.

In one embodiment, the second information is unrelated to the first signaling.

In one embodiment, the second information and the first signaling are independent.

In one embodiment, the second information is not carried by the first signaling.

In one embodiment, the first signaling comprises the second information.

In one embodiment, the first signaling does not comprise the second information.

In one embodiment, the third information is transferred inside the second communication node.

In one embodiment, the third information comprises higher-layer information, and the third information is transferred from a higher layer of the second communication node to a physical layer of the second communication node.

In one embodiment, the third information is pre-configured.

Embodiment 8

Figure 8:
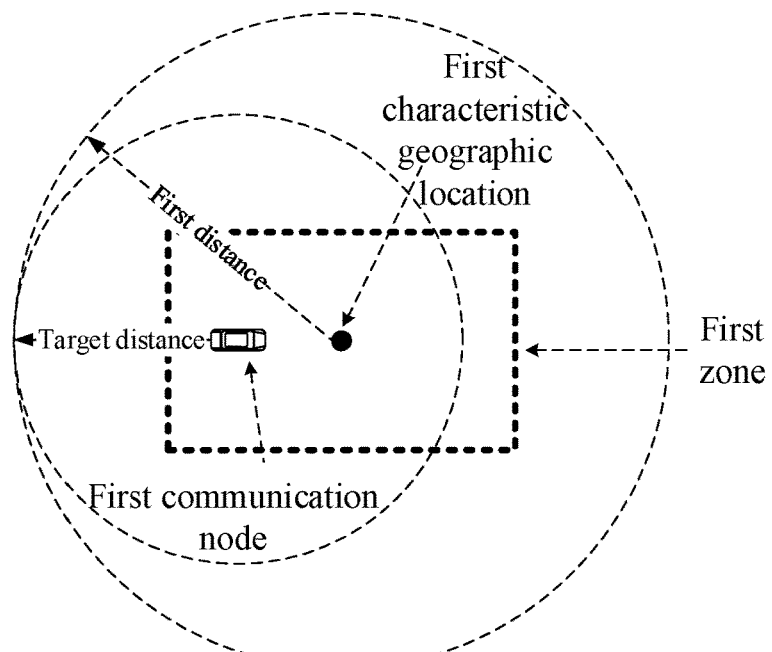
FIG. 8 illustrates a schematic diagram of a relation between a first distance and a target distance according to one embodiment of the present disclosure.

Embodiment 8 illustrates a schematic diagram of a relation between a first distance and a target distance according to one embodiment of the present disclosure, as shown in FIG. 8. In FIG. 8, the dotted rectangle represents a first zone, the solid point in the dotted rectangle represents a first characteristic geographic location, and the vehicle terminal icon represents a first communication node.

In embodiment 8, a difference value between a geographic location of the first communication node in the present disclosure and the first characteristic geographic location in the present disclosure is used to determine a difference value between the first distance in the present disclosure and the target distance in the present disclosure.

In one embodiment, the target distance is transmitted from a higher layer of the first communication node to a physical layer of the first communication node.

In one embodiment, the target distance is transferred from Non-Access Stratum (NAS) to Access Stratum (AS).

In one embodiment, the target distance is determined by the inside of the first communication node.

In one embodiment, a size of the target distance is determined by an application layer of the first communication node.

In one embodiment, a size of the target distance is implementation dependent with the first communication node.

In one embodiment, the target distance is expressed by a geographic distance.

In one embodiment, the target distance is a geodetic distance.

In one embodiment, the target distance is a 2D geographic distance.

In one embodiment, the target distance is a 3D geographic distance.

In one embodiment, the target distance is measured by m.

In one embodiment, the target distance is expressed by a transmission delay of a radio signal.

In one embodiment, the above phrase of "the first receiver determining a target distance" includes the following meaning: the first receiver receives information carrying the target distance.

In one embodiment, the above phrase of "the first receiver determining a target distance" includes the following meaning: the first receiver receives fifth information, and the fifth information is used to indicate the target distance.

In one embodiment, the above phrase of "the first receiver determining a target distance" includes the following meaning: the first receiver receives fifth information, the fifth information is used to indicate the target distance, and the fifth information is higher layer information.

In one embodiment, the above phrase of "the first receiver determining a target distance" includes the following meaning: the first receiver receives fifth information, the fifth information is used to indicate the target distance, and the fifth information is RRC information.

In one embodiment, the above phrase of "the first receiver determining a target distance" includes the following meaning: the first receiver receives fifth information, the fifth information is used to indicate the target distance, and the fifth information is configured.

In one embodiment, the above phrase of "the first receiver determining a target distance" includes the following meaning: the first receiver receives fifth information, the fifth information is used to indicate the target distance, and the fifth information is pre-configured.

In one embodiment, the above phrase of "the first receiver determining a target distance" includes the following meaning: the first receiver determines the target distance according to information transferred from a higher layer of the first communication node to a physical layer of the first communication node.

In one embodiment, the above phrase of "the first receiver determining a target distance" includes the following meaning: the first receiver receives the target distance information transferred from a higher layer of the first communication node to a physical layer of the first communication node.

In one embodiment, the above phrase of "the first receiver determining a target distance" includes the following meaning: the first receiver receives the target distance transferred from NAS to AS.

In one embodiment, the above phrase of "the first receiver determining a target distance" includes the following meaning: the first receiver receives the target distance information transferred from a higher layer of the first communication node.

In one embodiment, the above phrase of "the first receiver determining a target distance" includes the following meaning: the first receiver receives the target distance information transferred from NAS.

In one embodiment, the first distance is greater than the target distance.

In one embodiment, the first distance is equal to the target distance.

In one embodiment, the first distance is not less than the target distance.

In one embodiment, the first distance and the target distance are not equal.

In one embodiment, the first distance is less than the target distance.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic location is used by the first communication node in the present disclosure to determine a difference value between the first distance and the target distance.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic distance is equal to a difference value between the first distance and the target distance.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic distance is equal to an absolute value of a difference value between the first distance and the target distance.

In one embodiment, the above phrase of "a distance between a geographic location of the first communication node and the first characteristic geographic location being used to determine a difference value between the first distance and the target distance" includes the following meaning: a difference value between the first distance and the target distance is in a linear correlation with a distance between a geographic location of the first communication node and the first characteristic geographic location.

In one embodiment, the above phrase of "a distance between a geographic location of the first communication node and the first characteristic geographic location being used to determine a difference value between the first distance and the target distance" includes the following meaning: a difference value between the first distance and the target distance is in a linear positive correlation with a distance between a geographic location of the first communication node and the first characteristic geographic location.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic distance determines a difference value between the first distance and the target distance based on an operating relation.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic distance determines a difference value between the first distance and the target distance based on a mapping relation.

In one embodiment, the above phrase of "a distance between a geographic location of the first communication node and the first characteristic geographic location being used to determine a difference value between the first distance and the target distance" includes the following meaning: a distance between a geographic location of the first communication node and the first characteristic geographic distance determines a difference value between the first distance and the target distance based on a functional relation.

In one embodiment, the above phrase of "a distance between a geographic location of the first communication node and the first characteristic geographic location being used to determine a difference value between the first distance and the target distance" includes the following meaning: a sum of a distance between a geographic location of the first communication node and the first characteristic geographic location plus a second distance margin is equal to a difference value between the first distance and the target distance, and the second distance margin is predefined or fixed.

In one embodiment, the above phrase of "a distance between a geographic location of the first communication node and the first characteristic geographic location being used to determine a difference value between the first distance and the target distance" includes the following meaning: a sum of a geographic location of the first communication node and the first characteristic geographic location plus a second distance margin is equal to a difference value between the first distance and the target distance, and the second distance margin is configured or pre-configured.

Embodiment 9

Figure 9:
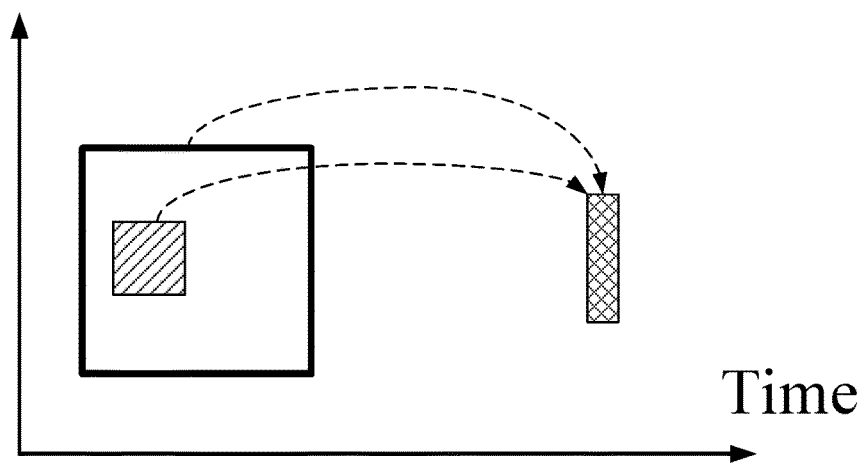
FIG. 9 illustrates a schematic diagram of relations among a first signaling, a first signal and a second signal according to one embodiment of the present disclosure.

Embodiment 9 illustrates a flowchart of relations among a first signaling, a first signal and a second signal according to one embodiment of the present disclosure, as shown in FIG. 9. In FIG. 9, the horizontal axis represents time, the vertical axis represents frequency, the slash-filled rectangle represents time-frequency resources occupied by a first signaling, the area outside the slash-filled rectangle in the solid-line framed rectangle represents time-frequency resources occupied by a first signal, and the cross-line filled rectangle represents time-frequency resources occupied by a second signal.

In embodiment 9, a first sequence is used to generate the second signal in the present disclosure; at least one of the time-frequency resources occupied by the first signaling in the present disclosure or time-frequency resources occupied by the first signal in the present disclosure is used to determine time-frequency resources occupied by the second signal, or at least one of the time-frequency resources occupied by the first signaling or time-frequency resources occupied by the first signal is used to determine the first sequence, or at least one of the time-frequency resources occupied by the first signaling or time-frequency resources occupied by the first signal is used to determine time-frequency resources occupied by the second signal and the first sequence.

In one embodiment, the first sequence is a Zadoff-Chu (ZC) sequence.

In one embodiment, the first sequence is composed of all or partial elements in a ZC sequence.

In one embodiment, the first sequence is a pseudo-random sequence.

In one embodiment, the first sequence is an m sequence.

In one embodiment, the first sequence is a Gold sequence.

In one embodiment, the first sequence is a Low Peak to Average Power Ratio (PAPR) sequence.

In one embodiment, the first sequence is acquired by transforming a ZC sequence.

In one embodiment, the first sequence is acquired from a ZC sequence through a Cyclic Shift.

In one embodiment, a length of the first sequence is equal to a positive integral multiple of 12.

In one embodiment, the above phrase of "a first sequence being used for generating the second signal" includes the following meaning: the first sequence sequentially goes through Mapping To Physical Resources, OFDM Baseband Signal Generation, and Modulation and Upconversion to generate the second signal.

In one embodiment, the above phrase of "a first sequence being used for generating the second signal" includes the following meaning: the first sequence is successively through Mapping To Physical Resources and OFDM Baseband Signal Generation to generate the second signal.

In one embodiment, "at least one of the time-frequency resources occupied by the first signaling or time-frequency resources occupied by the first signal" refers to the time-frequency resources occupied by the first signaling and time-frequency resources occupied by the first signal.

In one embodiment, "at least one of the time-frequency resources occupied by the first signaling or time-frequency resources occupied by the first signal" refers to the time-frequency resources occupied by the first signaling.

In one embodiment, "at least one of the time-frequency resources occupied by the first signaling or time-frequency resources occupied by the first signal" refers to time-frequency resources occupied by the first signal.

In one embodiment, the above phrase of "at least one of the time-frequency resources occupied by the first signaling or time-frequency resources occupied by the first signal being used for determining time-frequency resources occupied by the second signal" includes the following meaning: at least one of a position of the time-frequency resources occupied by the first signaling in time-frequency domain or a position of time-frequency resources occupied by the first signal in time-frequency domain is used to determine time-frequency resources occupied by the second signal.

In one embodiment, the above phrase of "at least one of the time-frequency resources occupied by the first signaling or time-frequency resources occupied by the first signal being used for determining the first sequence" includes the following meaning: at least one of a position of the time-frequency resources occupied by the first signaling in time-frequency domain or a position of time-frequency resources occupied by the first signal in time-frequency domain is used to determine an index of the first sequence.

In one embodiment, the above phrase of "at least one of the time-frequency resources occupied by the first signaling or time-frequency resources occupied by the first signal being used to determine time-frequency resources occupied by the second signal and the first sequence" includes the following meaning: at least one of a position of the time-frequency resources occupied by the first signaling in time-frequency domain or a position of time-frequency resources occupied by the first signal in time-frequency domain is used to determine time-frequency resources occupied by the second signal and an index of the first sequence.

In one embodiment, the above phrase of "at least one of the time-frequency resources occupied by the first signaling or time-frequency resources occupied by the first signal being used for determining time-frequency resources occupied by the second signal" includes the following meaning: at least one of a number of the time-frequency resources occupied by the first signaling or a number of time-frequency resources occupied by the first signal is used to determine time-frequency resources occupied by the second signal.

In one embodiment, the above phrase of "at least one of the time-frequency resources occupied by the first signaling or time-frequency resources occupied by the first signal being used for determining the first sequence" includes the following meaning: at least one of a number of the time-frequency resources occupied by the first signaling or a number of time-frequency resources occupied by the first signal is used to determine an index of the first sequence.

In one embodiment, the above phrase of "at least one of the time-frequency resources occupied by the first signaling or time-frequency resources occupied by the first signal being used to determine time-frequency resources occupied by the second signal and the first sequence" includes the following meaning: at least one of a number of the time-frequency resources occupied by the first signaling or a number of time-frequency resources occupied by the first signal is used to determine time-frequency resources occupied by the second signal and an index of the first sequence.

In one embodiment, the above phrase of "at least one of the time-frequency resources occupied by the first signaling or time-frequency resources occupied by the first signal being used for determining time-frequency resources occupied by the second signal" includes the following meaning: at least one of the time-frequency resources occupied by the first signaling or time-frequency resources occupied by the first signal is used to determine time-frequency resources occupied by the second signal based on a mapping relation.

In one embodiment, the above phrase of "at least one of the time-frequency resources occupied by the first signaling or time-frequency resources occupied by the first signal being used for determining the first sequence" includes the following meaning: at least one of the time-frequency resources occupied by the first signaling or time-frequency resources occupied by the first signal is used to determine an index of the first sequence based on a mapping relation.

In one embodiment, the above phrase of "at least one of the time-frequency resources occupied by the first signaling or time-frequency resources occupied by the first signal being used to determine time-frequency resources occupied by the second signal and the first sequence" includes the following meaning: at least one of the time-frequency resources occupied by the first signaling or time-frequency resources occupied by the first signal is used to determine time-frequency resources occupied by the second signal and an index of the first sequence based on a mapping relation.

Embodiment 10

Figure 10:
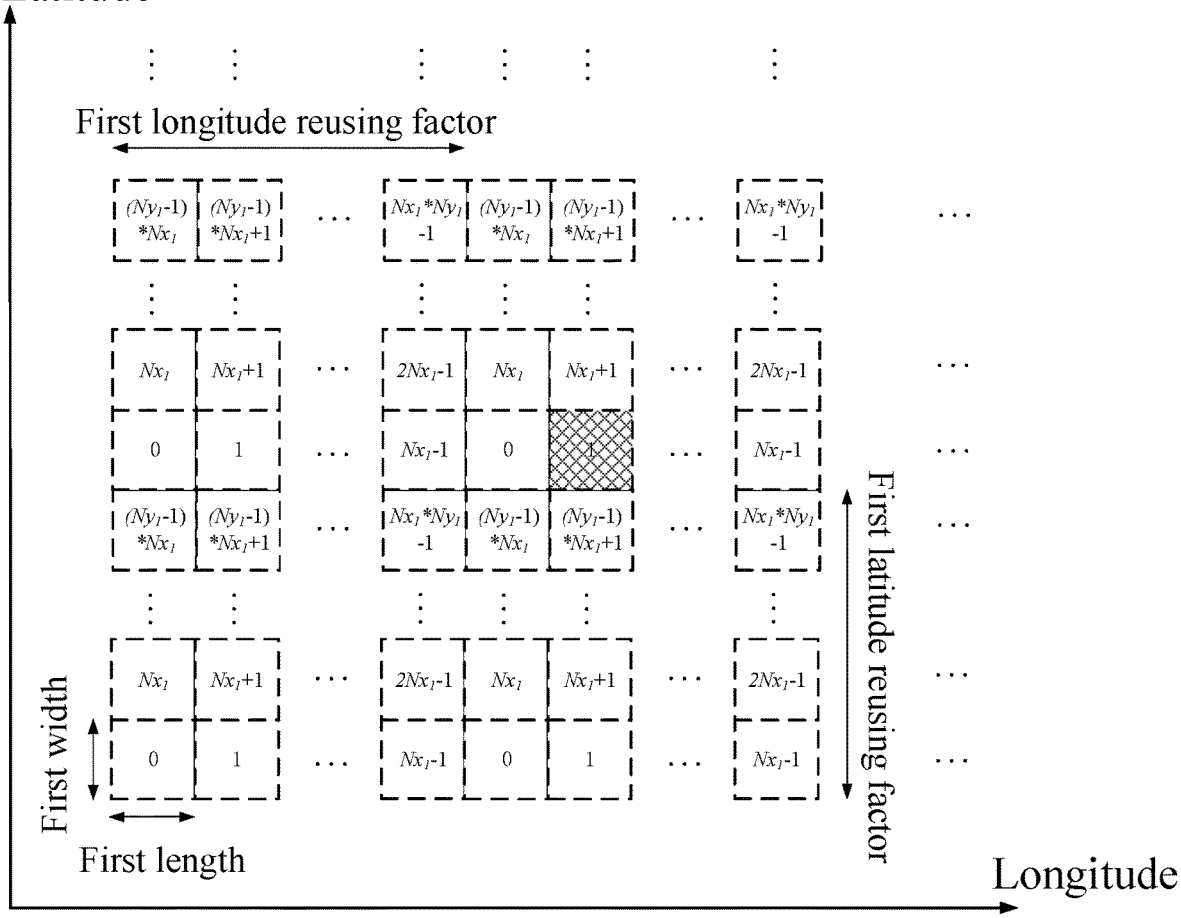
FIG. 10 illustrates a schematic diagram of Y zones according to one embodiment of the present disclosure.

Embodiment 10 illustrates a schematic diagram of Y zones according to one embodiment of the present disclosure, as shown in FIG. 10. In FIG. 10, the horizontal axis represents longitude, the vertical axis represents latitude, each dotted-line framed rectangle marked with a number represents one of Y zones, a number in the dotted-line framed rectangle represents an ID of a zone, the cross-line filled zone is a first zone, and $Nx_1$ represents the first longitude reusing factor and $Ny_1$ represents the first latitude reusing factor.

In embodiment 10, the first information in the present disclosure is used to determine a first length, a first width, a first longitude reusing factor and a first latitude reusing factor, the first length and the first width are used to determine Y zones, and the first zone in the present disclosure is one of the Y zones, Y being a positive integer greater than 1; a geographic location of the first communication node in the present disclosure is located within the first zone; and the first longitude reusing factor and the first latitude reusing factor are used together to determine the ID of the first zone.

In one embodiment, at least one of the first length, the first width, the first longitude reusing factor, or the first latitude reusing factor is related to the target distance in the present disclosure.

In one embodiment, at least one of the first length, the first width, the first longitude reusing factor, or the first latitude reusing factor is related to the first distance in the present disclosure.

In one embodiment, according to the WGS84 model, the first zone is a zone enclosed by a rectangle, and the first length is equal to a length of a rectangle enclosing the first zone.

In one embodiment, the first length is measured by m.

In one embodiment, the first length is equal to a geodesic distance between two geographic locations.

In one embodiment, the first length is equal to a geodesic distance between two points on a same latitude line on two longitude lines.

In one embodiment, according to the WGS84 model, the first zone is a zone enclosed by a rectangle, and the first width is equal to a width of a rectangle enclosing the first zone.

In one embodiment, the first width is measured by m.

In one embodiment, the first width is equal to a geodesic distance between two geographic locations.

In one embodiment, the first width is equal to a geodesic distance between two points on a same longitude line on two latitude lines.

In one embodiment, the first longitude reusing factor is a positive integer.

In one embodiment, the first latitude reusing factor is a positive integer.

In one embodiment, the first longitude reusing factor is a number of IDs of zones configured for longitude.

In one embodiment, the first latitude reusing factor is a number of IDs of zones configured for latitude.

In one embodiment, Y is equal to a number of zones into which the surface of the earth is divided.

In one embodiment, any of the Y zones is a geographically continuous zone occupying a contiguous latitude range and a contiguous longitude range.

In one embodiment, any of the Y zones occupies a continuous latitude interval and a continuous longitude interval.

In one embodiment, according to the WGS84 model, any of the Y zones is a zone enclosed by a rectangle.

In one embodiment, any of the Y zones is a zone on the surface of the earth.

In one embodiment, any one of the Y geographical regions is a circular zone.

In one embodiment, any of the Y zones is a zone enclosed by points of equal distance centered on a geographic location on the surface of the earth.

In one embodiment, any of the Y zones is a continuous zone on the surface of the earth.

In one embodiment, any of the Y zones is one of zones into which the surface of the earth is divided from coordinate points (0,0) in the WGS84 model (Military Standard WGS84 Metric MIL-STD-2401 (11 Jan. 1994): "Military Standard Department of Defence World Geodetic System (WGS)") with equal latitude interval and equal longitude interval.

In one embodiment, a geodesic distance of a longitude interval occupied by any two of the Y zones is equal.

In one embodiment, a geodesic distance of a latitude interval occupied by any two of the Y zones is equal.

In one embodiment, a geodesic distance of a longitude interval occupied by any of the Y zones is equal to the first length.

In one embodiment, a geodesic distance of a latitude interval occupied by any of the Y zones is equal to the first width.

In one embodiment, the above phrase of "the first length and the first width being used to determine Y zones" includes the following meaning: the first length and the first width are used by the first communication node in the present disclosure to determine the Y zones.

In one embodiment, the above phrase of "the first length and the first width being used to determine Y zones" includes the following meaning: the first length and the first width are used to determine the Y zones according to a mapping relation.

In one embodiment, the above phrase of "the first length and the first width being used to determine Y zones" includes the following meaning: Any of the Y zones is one of zones into which the surface of the earth is divided from the coordinate points (0,0) in the WGS84 model (Military Standard WGS84 Metric MIL-STD-2401 (11 Jan. 1994): "Military Standard Department of Defence World Geodetic System (WGS)") according to a latitude interval of the first width and a longitude interval of the first length at equal latitude interval and equal latitude interval.

In one embodiment, the Y zones are indexed in the order of longitude first and then latitude.

In one embodiment, the Y zones are arranged in the order of longitude first and then latitude.

In one embodiment, the Y zones are indexed in the order of latitude first and then longitude.

In one embodiment, the Y zones are arranged in the order of latitude first and then longitude.

In one embodiment, any two of the Y zones are orthogonal.

In one embodiment, there does not exist a zone belonging to two of the Y zones simultaneously.

In one embodiment, there does not exist an overlapped part in any two of the Y zones.

In one embodiment, the above phrase of "a first length and a first width being used to determine Y zones" is implemented through the following formula:

$$\text{Floor}(K\_x/L_1) = K \bmod Y1;$$

$$\text{Floor}(K\_y/W_1) = \text{Floor}(K/Y1);$$

Where $K=0, 1, 2, \ldots, Y-1$ is an index of one of the Y zones, K_x represents a longitude distance between any geographic location in zones indexed equal to K and coordinate points (0,0) in the WGS84 model, K_y represents a latitude distance between a geographic location indexed equal to K and coordinate points (0,0) in the WGS84 model, $L_1$ represents the first length, $W_1$ represents the first width, and Y1 represents a number of zones in the Y zones occupying a same latitude interval.

In one embodiment, the above phrase of "a first length and a first width being used to determine Y zones" is implemented through the following formula:

$$\text{Floor}(K\_x/L_1) = \text{Floor}(K/Y2);$$

$$\text{Floor}(K\_y/W_1) = K \bmod Y2;$$

Where $K=0, 1, 2, \ldots, Y-1$ is an index of one of the Y zones, K_x represents a longitude distance between any geographic location in zones indexed equal to K and coordinate points (0,0) in the WGS84 model, K_y represents a latitude distance between a geographic location indexed equal to K and coordinate points (0,0) in the WGS84 model, $L_1$ represents the first length, $W_1$ represents the first width, and Y2 respectively represent a number of zones in the Y zones occupying a same latitude interval.

In one embodiment, the above phrase of "a geographic location of the first communication node being located within the first zone" includes the following meaning: a geographic location of the first communication node is located inside the first zone or on the edge of the first zone.

In one embodiment, the above phrase of "a geographic location of the first communication node being located within the first zone" includes the following meaning: a geographic location of the first communication node belongs to the first zone.

In one embodiment, the above phrase of "a geographic location of the first communication node being located within the first zone" includes the following meaning: a geographic location of the first communication node is located inside the first zone.

In one embodiment, the above phrase of "a geographic location of the first communication node being located within the first zone" includes the following meaning: a geographic location of the first communication node is located on the edge of the first zone.

In one embodiment, a location of the first zone in the Y zones, the first longitude reusing factor and the first latitude reusing factor are used together to determine the ID of the first zone.

In one embodiment, the above phrase of "the first longitude reusing factor and the first latitude reusing factor being used to determine the ID of the first zone" includes the following meaning: the first longitude reusing factor and the first latitude reusing factor are used by the first communication node in the present disclosure to determine the ID of the first zone.

In one embodiment, the above phrase of "the first longitude reusing factor and the first latitude reusing factor being used to determine the ID of the first zone" includes the following meaning: the first longitude reusing factor and the first latitude reusing factor are used to determine the ID of the first zone based on an operating function.

In one embodiment, the above phrase of "the first longitude reusing factor and the first latitude reusing factor being used to determine the ID of the first zone" includes the following meaning: the first longitude reusing factor and the first latitude reusing factor are used to determine the ID of the first zone based on a mapping relation.

In one embodiment, the above phrase of "the first longitude reusing factor and the first latitude reusing factor being used to determine the ID of the first zone" includes the following meaning: the first longitude reusing factor and the first latitude reusing factor are used to determine the ID of the first zone based on the following calculation.

$$m_1 = \text{Floor}(\text{First\_}x/L_1) \bmod Nx_1;$$

$$n_1 = \text{Floor}(\text{First\_}y/W_1) \bmod Ny_1;$$

$$\text{Zone\_id}_1 = n_1 * Nx_1 + m_1$$

Where $\text{Zone\_id}_1$ represents an ID of the first zone, $L_1$ represents the first length in the present disclosure, $W_1$ represents the first width in the present disclosure, $Nx_1$ represents the first longitude reusing factor and $Ny_1$ represents the first latitude reusing factor, First_x represents a longitude distance between a current geographic location of the first communication node in the present disclosure and coordinate points (0,0) in the WGS84 model, and First_y represents a latitude distance between a current geographic location of the first communication node in the present disclosure and coordinate points (0,0) in the WGS84 model.

In one embodiment, the first length, the first width and a geographic location of the first communication node are used to determine the ID of the first zone.

In one embodiment, the above phrase of "the first longitude reusing factor and the first latitude reusing factor being used to determine the ID of the first zone" includes the following meaning: the first length, the first width, the first longitude reusing factor, the first latitude reusing factor and a geographic location of the first communication node are used together to determine the ID of the first zone.

In one embodiment, an index of the first zone in the Y zones is used to determine the ID of the first zone.

In one embodiment, the above phrase of "the first longitude reusing factor and the first latitude reusing factor being used to determine the ID of the first zone" includes the following meaning: an index of the first zone in the Y zones, the first longitude reusing factor, the first latitude reusing factor are used together to determine the ID of the first zone.

Embodiment 11

Figure 11:
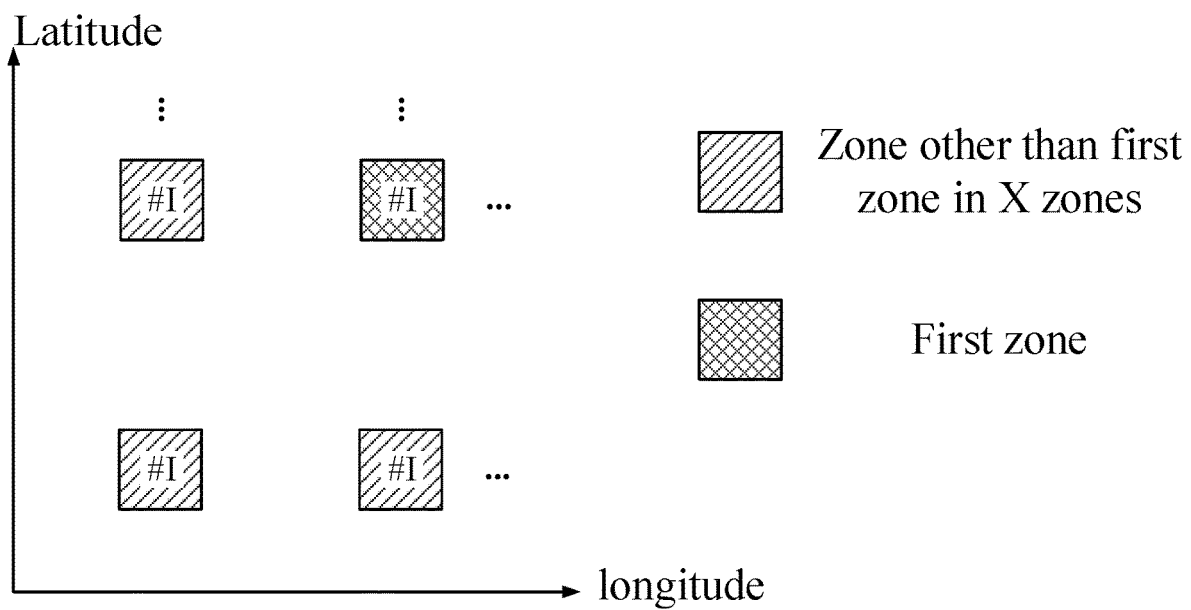
FIG. 11 illustrates a schematic diagram of X zones according to one embodiment of the present disclosure.

Embodiment 11 illustrates a schematic diagram of X zones according to one embodiment of the present disclosure, as shown in FIG. 11. In FIG. 11, two coordinate axes respectively represent longitude and latitude, each filled rectangle represents one of X zones, the cross-line filled zone is a first zone, each slash-filled rectangle represents a zone other than a first zone among X zones, and an ID "#I" in each rectangle represents a first ID.

In embodiment 11, the first zone in the present disclosure is one of X zones, any two of the X zones are orthogonal, X being a positive integer greater than 1; and an ID of any of the X zones is equal to the first ID in the present disclosure.

In one embodiment, X is less than Y in the present disclosure.

In one embodiment, X is equal to Y in the present disclosure.

In one embodiment, X is not greater than Y in the present disclosure.

In one embodiment, any of the X zones is one of the Y zones in the present disclosure.

In one embodiment, the above phrase of "any two of the X zones being orthogonal" includes the following meaning: any two of the X zones are non-overlapped.

In one embodiment, the above phrase of "any two of the X zones being orthogonal" includes the following meaning: there does not exist an overlapped part in any two of the X zones.

In one embodiment, the above phrase of "any two of the X zones being orthogonal" includes the following meaning: there does not exist a geographic location simultaneously belonging to two of the X zones.

In one embodiment, any of the X zones is geographically continuous and occupies a contiguous latitude range and a contiguous longitude range.

In one embodiment, any of the X zones occupies a continuous latitude interval and a continuous longitude interval.

In one embodiment, according to the WGS84 model, any of the X zones is a zone enclosed by a rectangle.

In one embodiment, any of the X zones is a zone on the surface of the earth.

In one embodiment, any of the X zones is a circular zone.

In one embodiment, any of the X zones is a zone enclosed by points of equal distance centered on a geographic location on the surface of the earth.

In one embodiment, any of the X zones is a continuous zone on the surface of the earth.

In one embodiment, any of the X zones in which the surface of the earth is divided from coordinate points (0,0) in the WGS84 model (Military Standard WGS84 Metric MIL-STD-2401 (11 Jan. 1994): "Military Standard Department of Defence World Geodetic System (WGS)") with equal latitude interval and equal longitude interval.

In one embodiment, a geodesic distance of a longitude interval occupied by any two of the X zones is equal.

In one embodiment, a geodesic distance of a latitude interval occupied by any two of the X zones is equal.

Embodiment 12

Figure 12:
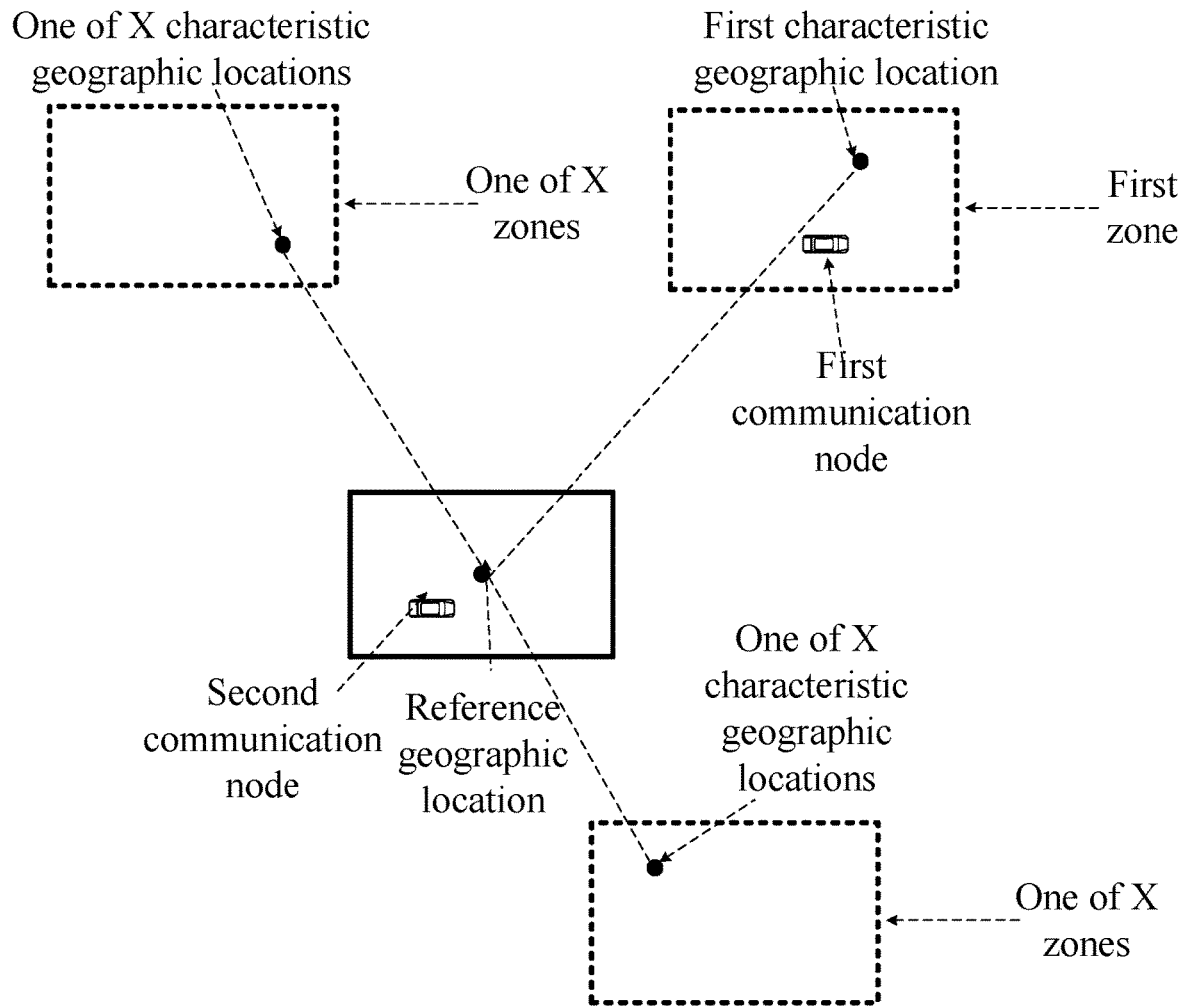
FIG. 12 illustrates a schematic diagram of a reference geographic location according to one embodiment of the present disclosure.

Embodiment 12 illustrates a schematic diagram of a reference geographic location according to one embodiment of the present disclosure, as shown in FIG. 12. In FIG. 12, each dotted-line framed rectangle represents one of X zones, the dots in each dotted-line framed rectangle represent X characteristic geographic locations, and the dot in the solid line box represents a reference geographic location.

In embodiment 12, the first ID in the present disclosure is used by the second communication node in the present disclosure to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal in the present disclosure is not correctly received, the second signal in the present disclosure is transmitted, otherwise the second signal is dropped to be transmitted.

In one embodiment, the above phrase of "the first ID being used to determine X zones" includes: an ID of any of the X zones is equal to the first ID.

In one embodiment, the above phrase of "the first ID being used to determine X zones" includes: the first ID is used by the second communication node in the present disclosure to determine the X zones.

In one embodiment, the above phrase of "the first ID being used to determine X zones" includes: the first ID is used to identify any of the X zones.

In one embodiment, the above phrase of "the first ID being used to determine X zones" includes: A longitude distance between a first geographic location and coordinate points (0,0) in the WGS84 model is equal to Q_x, a latitude distance between the first geographic location and coordinate points (0,0) in the WGS84 model is equal to Q_y, and when the first geographic location is located in one of the X zones, Q_x and Q_y satisfy the following formula:

$$m_1 = \text{Floor}(Q\_x/L_1) \text{ Mod } Nx_1;$$

$$n_1 = \text{Floor}(Q\_y/W_1) \text{ Mod } Ny_1;$$

$$\text{Zone\_id}_1 = n_1 * Nx_1 + m_1$$

Where $\text{Zone\_id}_1$ represents the first ID, $L_1$ represents a distance of a longitude interval occupied by any of the X zones, $W_1$ represents a distance of a latitude interval occupied by any of the X zones, and $Nx_1$ represents a longitude reusing factor and $Ny_1$ represents a latitude reusing factor.

In one embodiment, the above phrase of "the first ID being used to determine X zones" includes: A longitude distance between a first geographic location and coordinate points (0,0) in the WGS84 model is equal to Q_x, a latitude distance between the first geographic location and coordinate points (0,0) in the WGS84 model is equal to Q_y, and when the first geographic location is located in one of the X zones, Q_x and Q_y satisfy the following formula:

$$\text{Floor}(Q\_x/L_1) \text{ Mod } Nx_1 = \text{Zone\_id}_1 \text{ Mod } Nx_1$$

$$\text{Floor}(Q\_y/W_1) \text{ Mod } Ny_1 = \text{Floor}(\text{Zone\_id}_1/Nx_1);$$

Where $\text{Zone\_id}_1$ represents the first ID, $L_1$ represents a distance of a longitude interval occupied by any of the X zones, $W_1$ represents a distance of a latitude interval occupied by any of the X zones, and $Nx_1$ represents a longitude reusing factor and $Ny_1$ represents a latitude reusing factor.

In one embodiment, the above phrase of "the first ID being used to determine X zones" includes: A longitude distance between a first geographic location and coordinate points (0,0) in the WGS84 model is equal to Q_x, a latitude distance between the first geographic location and coordinate points (0,0) in the WGS84 model is equal to Q_y, and when the first geographic location is located in one of the X zones, Q_x and Q_y satisfy the following formula:

$$m_1 = \text{Floor}(Q\_x/L_1) \text{ Mod } Nx_1;$$

$$n_1 = \text{Floor}(Q\_y/W_1) \text{ Mod } Ny_1;$$

$$\text{Zone\_id}_1 = m_1 * Ny_1 + n_1$$

Where $\text{Zone\_id}_1$ represents the first ID, $L_1$ represents a distance of a longitude interval occupied by any of the X zones, $W_1$ represents a distance of a latitude interval occupied by any of the X zones, and $Nx_1$ represents a longitude reusing factor and $Ny_1$ represents a latitude reusing factor.

In one embodiment, the above phrase of "the first ID being used to determine X zones" includes: A longitude distance between a first geographic location and coordinate points (0,0) in the WGS84 model is equal to Q_x, a latitude distance between the first geographic location and coordinate points (0,0) in the WGS84 model is equal to Q_y, and when the first geographic location is located in one of the X zones, Q_x and Q_y satisfy the following formula:

$$\text{Floor}(Q\_x/L_1) \text{ Mod } Nx_1 = \text{Floor}(\text{Zone\_id}_1/Ny_1);$$

$$\text{Floor}(Q\_y/W_1) \text{ Mod } Ny_1 = \text{Zone\_id}_1 \text{ Mod } Ny_1;$$

Where $\text{Zone\_id}_1$ represents the first ID, $L_1$ represents a distance of a longitude interval occupied by any of the X zones, $W_1$ represents a distance of a latitude interval occupied by any of the X zones, and $Nx_1$ represents a longitude reusing factor and $Ny_1$ represents a latitude reusing factor.

In one embodiment, the above phrase of "the X zones respectively comprising X characteristic geographic locations" includes the following meaning: The X characteristic geographic locations are respectively located within the X zones.

In one embodiment, the above phrase of "the X zones respectively comprising X characteristic geographic locations" includes the following meaning: The X characteristic geographic locations are respectively geographic locations within the X zones.

In one embodiment, the above phrase of "the X zones respectively comprising X characteristic geographic locations" includes the following meaning: The X characteristic geographic locations are respectively inside the X zones or on the edge on the X zones.

In one embodiment, a location of any of the X characteristic geographic locations in a zone to which the X zones belong is fixed.

In one embodiment, a location of any of the X characteristic geographic locations in a zone to which the X zones belong is predefined.

In one embodiment, the first characteristic geographic location in the present disclosure is one of the X characteristic geographic locations.

In one embodiment, the first characteristic geographic location in the present disclosure is the same as a geographic location of one of the X characteristic geographic locations.

In one embodiment, the first characteristic geographic location in the present disclosure is a geographic location other than the X characteristic geographic locations.

In one embodiment, the first characteristic geographic location in the present disclosure is different from a geographic location of any of the X characteristic geographic locations.

In one embodiment, a geographic location of the second communication node is a current geographic location of the second communication node.

In one embodiment, a geographic location of the second communication node is a current geographic location of the second communication node assumed by the second communication node.

In one embodiment, a geographic location of the second communication node is a current geographic location acquired by the second communication node through measurement.

In one embodiment, a geographic location of the second communication node is a current actual geographic location of the second communication node.

In one embodiment, a geographic location of the second communication node is a geographic location other than a current actual geographic location of the second communication node.

In one embodiment, a geographic location of the second communication node is a current geographic location acquired by the second communication node through positioning.

In one embodiment, a geographic location of the second communication node is a current geographic location acquired by the second communication node through satellite positioning.

In one embodiment, a geographic location of the second communication node is a current geographic location acquired by the second communication node through satellite positioning and measurement.

In one embodiment, a geographic location of the second communication node assumed by the second communication node is a latitude distance and a longitude distance between the second communication node and coordinate points (0,0) in the WSG84 model (Military Standard WGS84 Metric MIL-STD-2401 (11 Jan. 1994): "Military Standard Department of Defence World Geodetic System (WGS)").

In one embodiment, the reference geographic location and a geographic location of the second communication node are a same geographic location.

In one embodiment, the reference geographic location and a geographic location of the second communication node are different.

In one embodiment, the reference geographic location is a geographic location other than a geographic location of the second communication node.

In one embodiment, the reference geographic location and a geographic location of the second communication node are located within a same zone.

In one embodiment, the above phrase of "a geographic location of the second communication node being used to determine a reference geographic location" includes the following meaning: a geographic location of the second communication node is used by the second communication node in the present disclosure to determine the reference geographic location.

In one embodiment, the above phrase of "a geographic location of the second communication node being used to determine a reference geographic location" includes the following meaning: a geographic location of the second communication node is the same as the reference geographic location.

In one embodiment, the above phrase of "a geographic location of the second communication node being used to determine a reference geographic location" includes the following meaning: the reference geographic location is different from a geographic location of the second communication node, and a geographic location of the second communication node determines that the reference geographic location is the same with the second communication node through a mapping relation.

In one embodiment, "a distance between one of the X characteristic geographic locations and the reference geographic location" refers to a geodesic distance between one of the X characteristic geographic locations and the reference geographic location.

In one embodiment, "a distance between one of the X characteristic geographic locations and the reference geographic location" refers to a straight-line distance between one of the X characteristic geographic locations and the reference geographic location.

In one embodiment, "a distance between one of the X characteristic geographic locations and the reference geographic location" refers to a 2D distance between one of the X characteristic geographic locations and the reference geographic location.

In one embodiment, "a distance between one of the X characteristic geographic locations and the reference geographic location" refers to a 3D distance between one of the X characteristic geographic locations and the reference geographic location.

Embodiment 13

Figure 13:
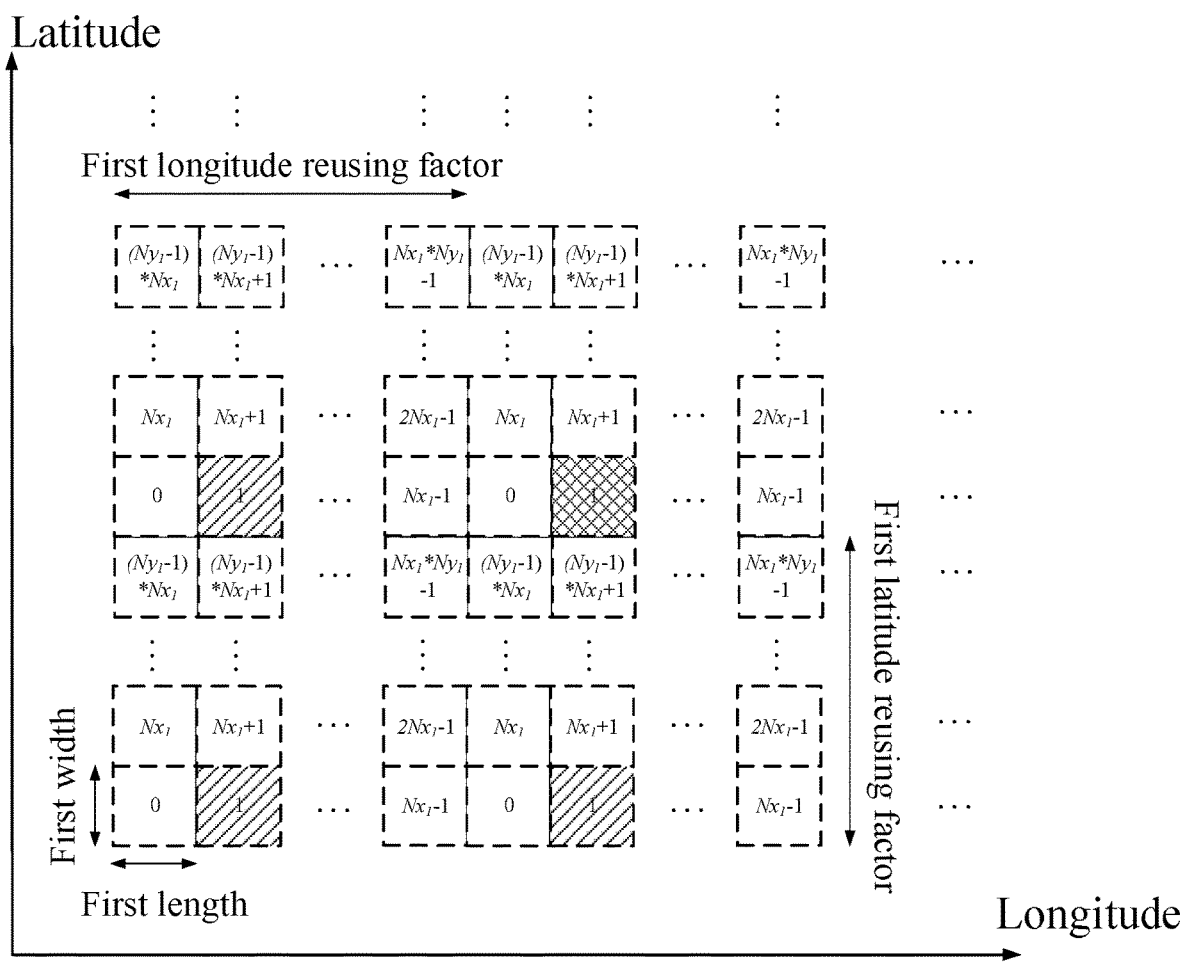
FIG. 13 illustrates a schematic diagram of relations among Y zones and X zones according to one embodiment of the present disclosure.

Embodiment 13 illustrates a schematic diagram of relations among Y zones and X zones according to one embodiment of the present disclosure, as shown in FIG. 13. In FIG. 13, two coordinate axes respectively represent longitude and latitude, each dotted-line framed rectangle marked with a number represents one of Y zones, a number in the dotted rectangle represents an ID of a corresponding zone, the cross-line filled zone is a first zone, each slash-filled zone is one of a zone other than a first zone among X zones, and $Nx_1$ represents the first longitude reusing factor and $Ny_1$ represents the first latitude reusing factor.

In embodiment 13, any of the X zones in the present disclosure is one of the Y zones in the present disclosure, Y being a positive integer greater than 1; the first ID in the present disclosure, the first longitude reusing factor in the present disclosure and the first latitude reusing factor in the present disclosure are used together to determine the X zones out of the Y zones.

In one embodiment, the phrase of "the first ID being used to determine X zones" in the present disclosure includes: the first ID, the first longitude reusing factor and the first latitude reusing factor are used together to determine the X zones out of the Y zones.

In one embodiment, the phrase of "the first ID being used to determine X zones" in the present disclosure includes: the first ID is used to identify any of the X zones, and the first ID is not used to identify any zone other than the X zones among the Y zones.

In one embodiment, the above phrase of "the first ID, the first longitude reusing factor and the first latitude reusing factor being used together to determine the X zones out of the Y zones" includes the following meaning: the first ID, the first longitude reusing factor and the first latitude reusing factor are used together by the second communication node in the present disclosure to determine the X zones out of the Y zones.

In one embodiment, the above phrase of "the first ID, the first longitude reusing factor and the first latitude reusing factor being used together to determine the X zones out of the Y zones" includes the following meaning: The X zones are zones in the Y zones satisfying the following formula:

$$m_1 = \text{Floor}(Q\_x/L_1) \text{Mod } Nx_1;$$

$$n_1 = \text{Floor}(Q\_y/W_1) \text{Mod } Ny_1;$$

$$\text{Zone\_id}_1 = n_1 * Nx_1 + m_1$$

Where $\text{Zone\_id}_1$ represents the first ID, $L_1$ represents the first length, $W_1$ represents the first width, $Nx_1$ represents the first longitude reusing factor and $Ny_1$ represents the first latitude reusing factor, a longitude distance and a latitude distance between any geographic location located within any of the X zones and coordinate points (0,0) in the WGS84 model are respectively equal to Q_x and Q_y.

In one embodiment, the above phrase of "the first ID, the first longitude reusing factor and the first latitude reusing factor being used together to determine the X zones out of the Y zones" includes the following meaning: The X zones are zones in the Y zones satisfying the following formula:

$$\text{Floor}(Q\_x/L_1) \text{Mod } Nx_1 = \text{Zone\_id}_1 \text{ Mod } Nx_1$$

$$\text{Floor}(Q\_y/W_1) \text{Mod } Ny_1 = \text{Floor}(\text{Zone\_id}_1/Nx_1);$$

Where $\text{Zone\_id}_1$ represents the first ID, $L_1$ represents the first length, $W_1$ represents the first width, $Nx_1$ represents the first longitude reusing factor and $Ny_1$ represents the first latitude reusing factor, a longitude distance and a latitude distance between any geographic location of any of the X zones and coordinate points (0,0) in the WGS84 model are respectively equal to Q_x and Q_y.

In one embodiment, the above phrase of "the first ID, the first longitude reusing factor and the first latitude reusing factor being used together to determine the X zones out of the Y zones" includes the following meaning: The X zones are zones in the Y zones satisfying the following formula:

$$m_1 = \text{Floor}(Q\_x/L_1) \text{Mod } Nx_1;$$

$$n_1 = \text{Floor}(Q\_y/W_1) \text{Mod } Ny_1;$$

$$\text{Zone\_id}_1 = m_1 * Ny_1 + n_1$$

Where $\text{Zone\_id}_1$ represents the first ID, $L_1$ represents the first length, $W_1$ represents the first width, $Nx_1$ represents the first longitude reusing factor and $Ny_1$ represents the first latitude reusing factor, a longitude distance and a latitude distance between any geographic location of any of the X zones and coordinate points (0,0) in the WGS84 model are respectively equal to Q_x and Q_y.

In one embodiment, the above phrase of "the first ID, the first longitude reusing factor and the first latitude reusing factor being used together to determine the X zones out of the Y zones" includes the following meaning: The X zones are zones in the Y zones satisfying the following formula:

$$\text{Floor}(Q\_x/L_1) \text{Mod } Nx_1 = \text{Floor}(\text{Zone\_id}_1/Ny_1);$$

$$\text{Floor}(Q\_y/W_1) \text{Mod } Ny_1 = \text{Zone\_id}_1 \text{ Mod } Ny_1;$$

Where $\text{Zone\_id}_1$ represents the first ID, $L_1$ represents the first length, $W_1$ represents the first width, $Nx_1$ represents the first longitude reusing factor and $Ny_1$ represents the first latitude reusing factor, a longitude distance and a latitude distance between any geographic location of any of the X zones and coordinate points (0,0) in the WGS84 model are respectively equal to Q_x and Q_y.

In one embodiment, the above phrase of "the first ID, the first longitude reusing factor and the first latitude reusing factor being used together to determine the X zones out of the Y zones" includes the following meaning: K=0, 1, 2, ..., Y−1 is an index of one of the Y zones, and index K of any of the X zones in the Y zones satisfying the following formula:

$$K \text{ Mod } Nx_1 = \text{Zone\_id}_1 \text{ Mod } Nx_1;$$

$$\text{Floor}(K/Y1) \text{Mod } Ny_1 = \text{Floor}(\text{Zone\_id}_1/Nx_1);$$

where $\text{Zone\_id}_1$ represents the first ID, $Nx_1$ represents the first longitude reusing factor and $Ny_1$ represents the first latitude reusing factor, $Y_1$ represents a number of zones occupying a same latitude interval among the Y zones.

In one embodiment, the above phrase of "the first ID, the first longitude reusing factor and the first latitude reusing factor being used together to determine the X zones out of the Y zones" includes the following meaning: K=0, 1, 2, ..., Y−1 is an index of one of the Y zones, and index K of any of the X zones in the Y zones satisfying the following formula:

$$\text{Floor}(K/Y2) \text{Mod } Nx_1 = \text{Zone\_id}_1 \text{ Mod } Nx_1;$$

$$K \text{ Mod } Ny_1 = \text{Floor}(\text{Zone\_id}_1/Nx_1);$$

where $\text{Zone\_id}_1$ represents the first ID, $Nx_1$ represents the first longitude reusing factor and $Ny_1$ represents the first latitude reusing factor, Y2 represents a number of zones occupying a same longitude interval among the Y zones.

Embodiment 14

Figure 14:
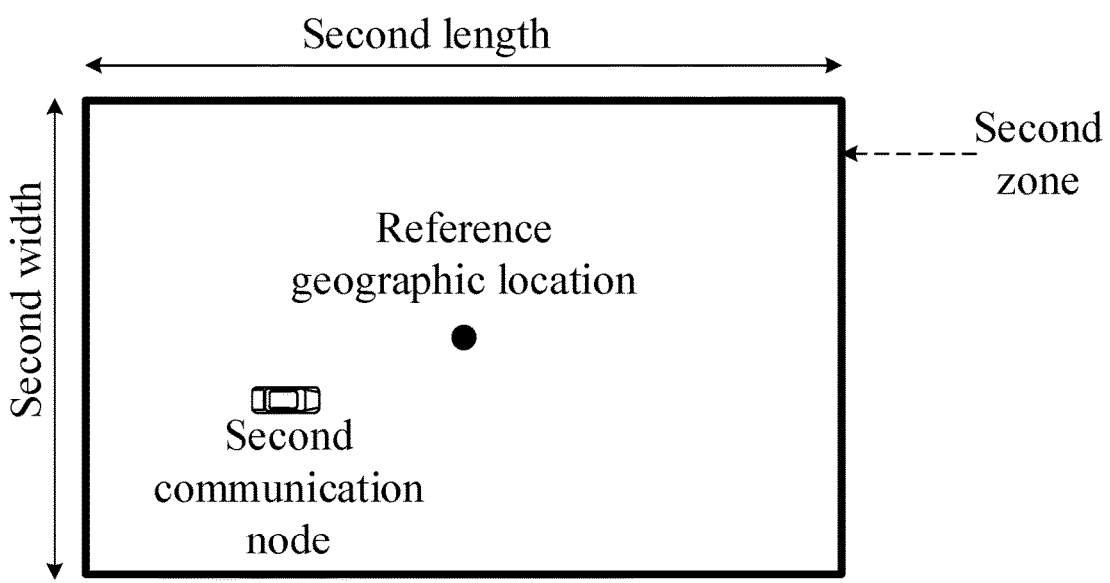
FIG. 14 illustrates a schematic diagram of a second zone according to one embodiment of the present disclosure.

Embodiment 14 illustrates a schematic diagram of a second zone according to one embodiment of the present disclosure, as shown in FIG. 14. In FIG. 14, the solid-line framed rectangle represents a second zone, a length of the solid-line framed rectangle is a second length, a width of the solid-line framed rectangle is a second width, and the black dot in the solid-line framed rectangle represents a reference geographic location.

In embodiment 14, the third information in the present disclosure is used to determine a second length and a second width, a geographic location of the second communication node in the present disclosure, the second length and the second width are used to determine a second zone, and the reference geographic location in the present disclosure is a predefined geographic location in the second zone.

In one embodiment, according to the WGS84 model, the second zone is a zone enclosed by a rectangle, and the second length is equal to a length of a rectangle enclosing the second zone.

In one embodiment, the second length is measured by m.

In one embodiment, the second length is equal to a geodesic distance between two geographic locations.

In one embodiment, the second length is equal to a geodesic distance between two points on a same latitude line on two longitude lines.

In one embodiment, according to the WGS84 model, the second zone is a zone enclosed by a rectangle, and the second width is equal to a width of a rectangle enclosing the second zone.

In one embodiment, the second width is measured by m.

In one embodiment, the second width is equal to a geodesic distance between two geographic locations.

In one embodiment, the second width is equal to a geodesic distance between two points on a same longitude line on two latitude lines.

In one embodiment, the above phrase of "a geographic location of the second communication node, the second length and the second width being used together to determine a second zone" includes the following meaning: The second zone is one of zones in which the surface of the earth is divided at equal longitude and latitude intervals from coordinate points (0,0) in the WGS84 model (Military Standard WGS84 Metric MIL-STD-2401 (11 Jan. 1994): "Military Standard Department of Defence World Geodetic System (WGS)") according to a latitude interval of the second width and a longitude interval of the second length, and the second communication node in the present disclosure is located in the second zone.

In one embodiment, the above phrase of "a geographic location of the second communication node, the second length and the second width being used together to determine a second zone" includes the following meaning:

a geographic location of the second communication node, the second length and the second width being used together to determine a second zone is used to determine an ID of the second zone, and an ID of the second zone is acquired through the following formula:

$$m_2 = \text{Floor}(\text{Second\_}x/L_2) \bmod Nx_2;$$

$$n_2 = \text{Floor}(\text{Second\_}y/W_2) \bmod Ny_2;$$

$$\text{Zone\_id}_2 = n_2 * Nx_2 + m_2$$

Where $\text{Zone\_id}_2$ represents an ID of the second zone, $L_2$ represents the second length, $W_2$ represents the second width, $Nx_2$ and $Ny_2$ are configured or pre-configured, Second\_x represents a longitude distance between a current geographic location of the second communication node in the present disclosure and coordinate points (0,0) in the WGS84 model, and Second\_y represents a latitude distance between a current geographic location of the third communication node in the present disclosure and coordinate points (0,0) in the WGS84 model.

In one embodiment, the above phrase of "a geographic location of the second communication node, the second length and the second width being used together to determine a second zone" includes the following meaning: A longitude distance between a first geographic location and coordinate points (0,0) in the WGS84 model is equal to Q\_x, a latitude distance between the first geographic location and coordinate points (0,0) in the WGS84 model is equal to Q\_y, and when the first geographic location is located in the second zone, Q\_x and Q\_y satisfy the following formula:

$$\text{Floor}(Q\_x/L_2) \bmod Nx_2 = \text{Floor}(\text{Second\_}x/L_2) \bmod Nx_2;$$

$$\text{Floor}(Q\_y/W_2) \bmod Ny_2 = \text{Floor}(\text{Second\_}y/W_2) \bmod Ny_2;$$

Where $L_2$ represents the second length, $W_2$ represents the second width, $Nx_2$ and $Ny_2$ are configured or pre-configured, Second\_x represents a longitude distance between a current geographic location of the second communication node in the present disclosure and coordinate points (0,0) in the WGS84 model, and the Second\_y represents a latitude distance between a current geographic location of the third communication node in the present disclosure and a coordinate points (0,0) in the WGS84 model.

In one embodiment, the second length is not equal to the first length.

In one embodiment, the second length is equal to the first length.

In one embodiment, the second length is equal to W times of the first length, W being equal to an integral power of 2.

In one embodiment, the second width is not equal to the first width.

In one embodiment, the second width is equal to the first width.

In one embodiment, the second width is equal to T times of the first width, T being equal to an integral power of 2.

In one embodiment, the above phrase of "the reference geographic location being a predefined geographic location within the second zone" includes the following meaning: the reference geographic location is a central location within the second zone.

In one embodiment, the above phrase of "the reference geographic location being a predefined geographic location within the second zone" includes the following meaning: the reference geographic location is a location on the edge of the second zone.

In one embodiment, the above phrase of "the reference geographic location being a predefined geographic location within the second zone" includes the following meaning: the reference geographic location is a geographic location farthest from a central location in the second zone.

In one embodiment, the above phrase of "the reference geographic location being a predefined geographic location within the second zone" includes the following meaning: the reference geographic location is a geographic location where a central longitude line in a longitude interval occupied by the second zone meets a central latitude line in a latitude interval occupied by the first zone.

In one embodiment, the above phrase of "the reference geographic location being a predefined geographic location within the second zone" includes the following meaning: the reference geographic location is a fixed geographic location other than a central location in the second zone.

In one embodiment, the above phrase of "the reference geographic location being a predefined geographic location within the second zone" includes the following meaning: the reference geographic location is a geographic location other than a geographic location where a central longitude line in a longitude interval occupied by the second zone meets a central latitude line in a latitude interval occupied by the second zone.

In one embodiment, the above phrase of "the reference geographic location being a predefined geographic location within the second zone" includes the following meaning: a relative location of the reference geographic location in the second zone is fixed.

Embodiment 15

Figure 15:
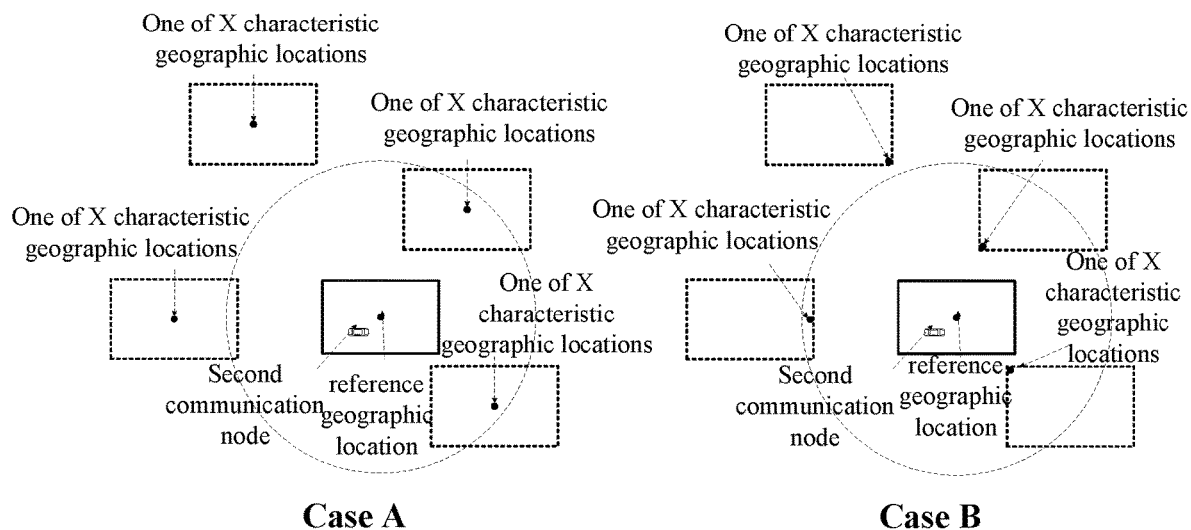
FIG. 15 illustrates a schematic diagram of X characteristic geographic locations according to one embodiment of the present disclosure.

Embodiment 15 illustrates a schematic diagram of X characteristic geographic locations in the present disclosure according to one embodiment of the present disclosure, as shown in FIG. 15. In FIG. 15, each dotted-line framed rectangle represents one of X zones, the solid point in each dotted-line framed rectangle represents one of X characteristic geographic locations, the solid point in the solid-line framed rectangle represents a reference geographic location, the dotted-line framed circle is a circle centered on the reference geographic location with a first distance as the radius, and the case A and case B respectively represent two definitions of X characteristic geographic locations.

In embodiment 15, the X characteristic geographic locations are respectively X predefined geographic locations located within the X zones, or the X characteristic geographic locations are respectively X geographic locations located within the X zones closest to the reference geographic location.

In one embodiment, the above phrase of "the X characteristic geographic locations being respectively in X predefined geographic locations in the X zones" includes the following meaning: The X characteristic zones are respectively X fixed zones located in the X zones.

In one embodiment, the above phrase of "the X characteristic geographic locations being respectively in X predefined geographic locations in the X zones" includes the following meaning: The X characteristic geographic locations are respectively X central geographic locations in the X zones.

In one embodiment, the above phrase of "the X characteristic geographic locations being respectively in X predefined geographic locations in the X zones" includes the following meaning: The X characteristic geographic locations are respectively X geographic locations located at the farthest end of the X zones from the central geographic locations of the X zones.

In one embodiment, the above phrase of "the X characteristic geographic locations being respectively in X predefined geographic locations in the X zones" includes the following meaning: The X characteristic geographic locations are respectively X geographic locations where a central longitude line in a longitude interval occupied by the X zones meets a central latitude line in a latitude interval occupied by the X zones.

Embodiment 16

Figure 16:
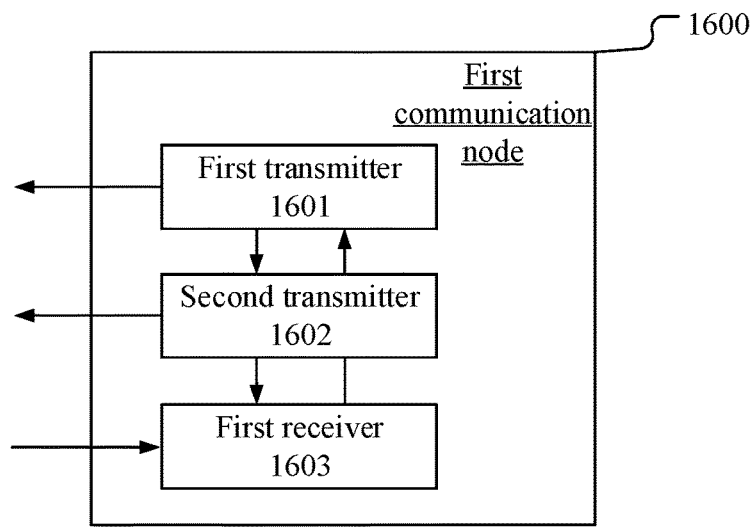
FIG. 16 illustrates a structure block diagram of a processing device in a first communication node according to one embodiment of the present disclosure.

Embodiment 16 illustrates a structure block diagram of a processing device in a first communication node, as shown in FIG. 16. In FIG. 16, a processing device 1600 of the first communication node comprises a first transmitter 1601, a second transmitter 1602 and a first receiver 1603. The first transmitter 1601 comprises the transmitter/receiver 416 (including the antenna 420), the transmitting processor 415 and the controller/processor 440 in FIG. 4 of the present disclosure; or the first transmitter 1601 comprises the transmitter/receiver 556 (including the antenna 560), the transmitting processor 555 and the controller/processor 590 in FIG. 5 of the present disclosure; the second transmitter 1602 comprises the transmitter/receiver 416 (including the antenna 420), the transmitting processor 415 and the controller/processor 440 in FIG. 4 of the present disclosure; or the second transmitter 1602 comprises the transmitter/receiver 556 (including the antenna 560), the transmitting processor 555 and the controller/processor 590 in FIG. 5 of the present disclosure; the first receiver 1603 comprises the transmitter/receiver 416 (including the antenna 420), the receiving processor 412 and the controller/processor 440 in FIG. 4 of the present disclosure; or the first receiver 1603 comprises the transmitter/receiver 556 (including the antenna 560), the receiving processor 552 and the controller/processor 590 in FIG. 5 of the present disclosure.

In embodiment 16, the first transmitter 1601 transmits a first signaling, the first signaling is used to indicate a first ID and a first distance; the second transmitter 1602 transmits a first signal, the first signaling is also used to indicate time-frequency resources occupied by the first signal; and a first receiver 1603 monitors a second signal, the second signal is used to determine that the first signal is not correctly received; herein, a geographic location of the first communication node is used to determine a first zone, and an ID of the first zone is used to determine the first ID; a first characteristic geographic location is a geographic location located within the first zone; a distance between a geographic location of the first communication node and the first characteristic geographic location is used to determine the first distance; when the second signal is detected, the first communication node assumes that a distance between a geographic location of a transmitter of the second signal and the first characteristic geographic location is not greater than the first distance.

In one embodiment, the first receiver 1603 determines a target distance; herein, a distance between a geographic location of the first communication node and the first characteristic geographic distance is used to determine a difference value between the first distance and the target distance.

In one embodiment, a first sequence is used for generating the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence.

In one embodiment, the first receiver 1603 receives first information; herein, the first information is used to determine a first length, a first width, a first longitude reusing factor and a first latitude reusing factor, the first length and the first width are used to determine Y zones, and the first zone is one of the Y zones, Y being a positive integer greater than 1; a geographic location of the first communication node is located within the first zone; and the first longitude reusing factor and the first latitude reusing factor are used together to determine the ID of the first zone.

In one embodiment, the first zone is one of X zones, any two of the X zones are orthogonal, X being a positive integer greater than 1; and an ID of any of the X zones is equal to the first ID.

In one embodiment, the first transmitter 1601 transmits second information; herein, the second information is used to indicate the first length, the first width, the first longitude reusing factor and the first latitude reusing factor.

Embodiment 17

Figure 17:
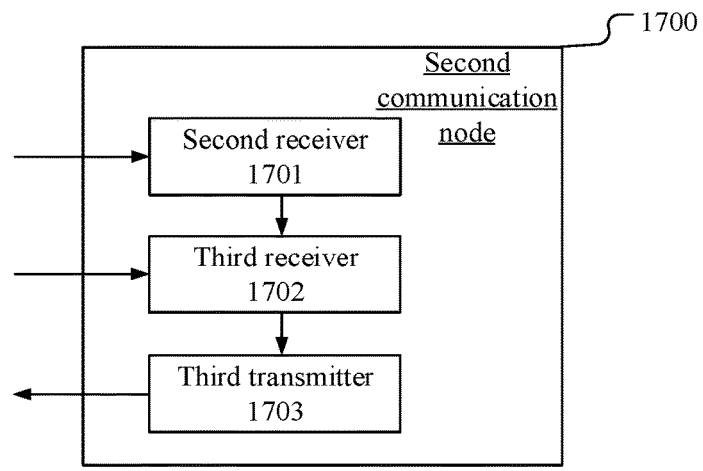
FIG. 17 illustrates a structure block diagram of a processing device in a second communication node according to one embodiment of the present disclosure.

Embodiment 17 illustrates a structure block diagram of a processing device of a second communication node according to one embodiment, as shown in FIG. 17. In FIG. 17, a processing device 1700 of the second communication node comprises a second receiver 1701, a third receiver 1702 and a third transmitter 1703. The second receiver 1701 comprises the transmitter/receiver 456 (including the antenna 460), the receiving processor 452 and the controller/processor 490 in FIG. 4 of the present disclosure; the third receiver 1702 comprises the transmitter/receiver 456 (including the antenna 460), the receiving processor 452 and the controller/processor 490 in FIG. 4 of the present disclosure; the third transmitter 1703 comprises the transmitter/receiver 456 (including the antenna 460) and the transmitting processor 455 in FIG. 4 of the present disclosure.

In embodiment 17, the second receiver 1701 receives a first signaling, the first signaling is used to determine a first ID and a first distance; the third receiver 1702 receives a first signal, the first signaling is used to determine time-frequency resources occupied by the first signal; and the third transmitter 1703 transmits a second signal, or drops transmitting the second signal, the second signaling is used to determine that the first signal is not correctly received; herein, the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

In one embodiment, a first sequence is used for generating the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence.

In one embodiment, the second receiver 1701 receives second information; herein, the second information is used to determine a first length, a first width, a first longitude reusing factor and a first latitude reusing factor, the first length and the first width are used to determine Y zones, and any of the X zones is one of the Y zones, Y being a positive integer greater than 1; the first ID, the first longitude reusing factor and the first latitude reusing factor are used together to determine the X zones out of the Y zones.

In one embodiment, the second receiver 1701 receives third information, the third information is used to determine a second length and a second width, a geographic location of the second communication node, the second length and the second width are used together to determine a second zone, and the reference geographic location is a predefined geographic location within the second zone.

In one embodiment, the X characteristic geographic locations are respectively X predefined geographic locations located within the X zones, or the X characteristic geographic locations are respectively X geographic locations located within the X zones closest to the reference geographic location.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first communication node or the second communication node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A second communication node for wireless communications, comprising:
   a second receiver, receiving a first signaling, the first signaling being used to determine a first identity (ID) and a first distance, the first ID is a zone ID;
   a third receiver, receiving a first signal, the first signaling also being used to determine time-frequency resources occupied by the first signal; and
   a third transmitter, transmitting a second signal, or cancelling transmission of the second signal, the second signaling being used to indicate that the first signal is not correctly received by the third receiver;
   wherein the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

2. The second communication node according to claim 1, wherein a first sequence is used to generate the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence; the first sequence is a Low Peak to Average Power Ratio (PAPR) sequence, a length of the first sequence is equal to a positive integral multiple of 12, the first sequence sequentially goes through Mapping To Physical Resources, OFDM Baseband Signal Generation, and Modulation and Upconversion to generate the second signal.

3. The second communication node according to claim 1, wherein the second receiver receives second information; wherein the second information is used to determine a first length, a first width, a first longitude reusing factor and a first latitude reusing factor, the first length and the first width are used to determine Y zones, and any of the X zones is one of the Y zones, Y being a positive integer greater than 1; and the first ID, the first longitude reusing factor and the first latitude reusing factor are used together to determine the X zones out of the Y zones.

4. The second communication node according to claim 3, wherein the second information comprises partial or all fields in Sidelink Control Information (SCI), and the second information is transmitted through a Physical Sidelink Shared Channel (PSSCH); or the second information comprises all or partial fields in an Information Element (IE) in a Radio Resource Control (RRC) signaling.

5. The second communication node according to claim 1, wherein the X characteristic geographic locations are respectively X predefined geographic locations located within the X zones, or the X characteristic geographic locations are respectively X geographic locations located within the X zones closest to the reference geographic location.

6. The second communication node according to claim 1, wherein the first signaling carries partial or all fields in SCI, and the first signaling is transmitted through a Physical Sidelink Control Channel (PSCCH); the first signaling is used to indirectly indicate the first ID and the first distance, and the first signaling is also used to explicitly indicate time-frequency resources occupied by the first signal.

7. The second communication node according to claim 1, wherein the first ID is a zone ID, the first ID is a non-negative integer, the first distance is a geodesic distance, and the first distance is measured by meter (m).

8. The second communication node according to claim 1, wherein the first signal is transmitted through a Physical Sidelink Shared Channel (PSSCH), and all or part of a Transport Block (TB) is used to generate the first signal; the second signal is transmitted through a Physical Sidelink Feedback Channel (PSFCH), and the second signal carries a Hybrid Automatic Repeat Request (HARQ) Non-Acknowledge (NACK) feedback; when the second signal is detected, a receiver of the second signal assumes that the first signal is not correctly received; otherwise a receiver of the second signal assumes that the first signal is correctly received.

9. The second communication node according to claim 1, wherein any of the X zones is one of zones into which the surface of the earth is divided from coordinate points (0,0) in the WGS84 model (Military Standard WGS84 Metric MIL-STD-2401 (11 Jan. 1994): "Military Standard Department of Defence World Geodetic System (WGS)") with equal latitude interval and equal longitude interval; any of the X zones is geographically continuous and occupies a contiguous latitude range and a contiguous longitude range; and an ID of any of the X zones is equal to the first ID.

10. The second communication node according to claim 1, wherein a geographic location of the second communication node is a current geographic location of the second communication node, and the reference geographic location and a geographic location of the second communication node are a same geographic location.

11. A method in a second communication node for wireless communications, comprising:
receiving a first signaling, the first signaling being used to determine a first ID and a first distance, the first ID is a zone ID;
receiving a first signal, the first signaling also being used to determine time-frequency resources occupied by the first signal; and
transmitting a second signal, or cancelling transmission of the second signal, the second signal being used to indicate that the first signal is not correctly received;
wherein the first ID is used to determine X zones, X being a positive integer greater than 1, and any two of the X zones are orthogonal; the X zones respectively comprise X characteristic geographic locations; a geographic location of the second communication node is used to determine a reference geographic location; when a distance between one of the X characteristic geographic locations and the reference geographic location is not greater than the reference distance and the first signal is not correctly received, the second signal is transmitted, otherwise the second signal is cancelled.

12. The method in a second communication node according to claim 11, wherein a first sequence is used to generate the second signal; at least one of time-frequency resources occupied by the first signaling or time-frequency resources occupied by the first signal is used to determine time-frequency resources occupied by the second signal, or at least one of time-frequency resources occupied by the first signaling or time-frequency resources occupied by the first signal is used to determine the first sequence, or at least one of time-frequency resources occupied by the first signaling or time-frequency resources occupied by the first signal is used to determine time-frequency resources occupied by the second signal and the first sequence; the first sequence is a PAPR sequence, a length of the first sequence is equal to a positive integral multiple of 12, the first sequence sequentially goes through Mapping To Physical Resources, OFDM Baseband Signal Generation, and Modulation and Upconversion to generate the second signal.

13. The method in a second communication node according to claim 11, comprising:
receiving second information;
wherein the second information is used to determine a first length, a first width, a first longitude reusing factor and a first latitude reusing factor, the first length and the first width are used to determine Y zones, and any of the X zones is one of the Y zones, Y being a positive integer greater than 1; the first ID, the first longitude reusing factor and the first latitude reusing factor are used together to determine the X zones out of the Y zones.

14. The method in a second communication node according to claim 13, wherein the second information comprises partial or all fields in SCI, and the second information is transmitted through a PSSCH; or the second information comprises all or partial fields in an IE in an RRC signaling.

15. The method in a second communication node according to claim 11, wherein the X characteristic geographic locations are respectively X predefined geographic locations located within the X zones, or the X characteristic geographic locations are respectively X geographic locations located within the X zones closest to the reference geographic location.

16. The method in a second communication node according to claim 11, wherein the first signaling carries partial or all fields in SCI, and the first signaling is transmitted through a PSCCH; the first signaling is used to indirectly indicate the first ID and the first distance, and the first signaling is also used to explicitly indicate time-frequency resources occupied by the first signal.

17. The method in a second communication node according to claim 11, wherein the first ID is a zone ID, the first ID is a non-negative integer, the first distance is a geodesic distance, and the first distance is measured by m.

18. The method in a second communication node according to claim 11, wherein the first signal is transmitted through a PSSCH, and all or part of a TB is used to generate the first signal; the second signal is transmitted through a PSFCH, and the second signal carries a HARQ NACK feedback; when the second signal is detected, a receiver of the second signal assumes that the first signal is not correctly received; otherwise a receiver of the second signal assumes that the first signal is correctly received.

19. The method in a second communication node according to claim 11, wherein any of the X zones is one of zones into which the surface of the earth is divided from coordinate points (0,0) in the WGS84 model (Military Standard WGS84 Metric MIL-STD-2401 (11 Jan. 1994): "Military Standard Department of Defence World Geodetic System (WGS)") with equal latitude interval and equal longitude interval; any of the X zones is geographically continuous and occupies a contiguous latitude range and a contiguous longitude range; and an ID of any of the X zones is equal to the first ID.

20. The method in a second communication node according to claim 11, wherein a geographic location of the second communication node is a current geographic location of the second communication node, and the reference geographic location and a geographic location of the second communication node are a same geographic location.

\* \* \* \* \*